US012645936B2

(12) United States Patent
Hanumante et al.

(10) Patent No.: US 12,645,936 B2
(45) Date of Patent: Jun. 2, 2026

(54) FIXED-POINT MULTIPLICATION FOR NETWORK QUANTIZATION

(71) Applicants: Sumant Milind Hanumante, Aliso Viejo, CA (US); Qing Jin, Palo Alto, CA (US); Sergei Korolev, Playa Vista, CA (US); Denys Makoviichuk, Playa Vista, CA (US); Jian Ren, Highland Park, NJ (US); Dhritiman Sagar, Marina Del Rey, CA (US); Patrick Timothy McSweeney Simons, Redondo Beach, CA (US); Sergey Tulyakov, Santa Monica, CA (US); Yang Wen, San Jose, CA (US); Richard Zhuang, San Diego, CA (US)

(72) Inventors: Sumant Milind Hanumante, Aliso Viejo, CA (US); Qing Jin, Palo Alto, CA (US); Sergei Korolev, Playa Vista, CA (US); Denys Makoviichuk, Playa Vista, CA (US); Jian Ren, Highland Park, NJ (US); Dhritiman Sagar, Marina Del Rey, CA (US); Patrick Timothy McSweeney Simons, Redondo Beach, CA (US); Sergey Tulyakov, Santa Monica, CA (US); Yang Wen, San Jose, CA (US); Richard Zhuang, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 1128 days.

(21) Appl. No.: 17/566,877

(22) Filed: Dec. 31, 2021

(65) Prior Publication Data

US 2023/0214639 A1     Jul. 6, 2023

(51) Int. Cl.
*G06N 3/08*          (2023.01)

(52) U.S. Cl.
CPC ..................................... *G06N 3/08* (2013.01)

(58) Field of Classification Search
CPC ............. G06N 3/08; G06N 3/04; G06N 3/063
See application file for complete search history.

(56) References Cited

U.S. PATENT DOCUMENTS

2019/0042948 A1* 2/2019 Lee ......................... G06N 3/063
2019/0279072 A1* 9/2019 Gao ........................ G06N 3/045
(Continued)

OTHER PUBLICATIONS

Choi, Jungwook, et al. "Pact: Parameterized clipping activation for quantized neural networks." arXiv preprint arXiv:1805.06085 (2018). (Year: 2018).*

(Continued)

*Primary Examiner* — Kamran Afshar
*Assistant Examiner* — Brian J Hales
(74) *Attorney, Agent, or Firm* — CM Law; Stephen J. Weed

(57) ABSTRACT

Techniques for training a neural network having a plurality of computational layers with associated weights and activations for computational layers in fixed-point formats include determining an optimal fractional length for weights and activations for the computational layers; training a learned clipping-level with fixed-point quantization using a PACT process for the computational layers; and quantizing on effective weights that fuses a weight of a convolution layer with a weight and running variance from a batch normalization layer. A fractional length for weights of the computational layers is determined from current values of weights using the determined optimal fractional length for the weights of the computational layers. A fixed-point activation between adjacent computational layers is related using PACT quantization of the clipping-level and an activation fractional length from a node in a following computational (Continued)

layer. The resulting fixed-point weights and activation values are stored as a compressed representation of the neural network.

18 Claims, 14 Drawing Sheets

(56)                    References Cited

U.S. PATENT DOCUMENTS

| | | | |
|---|---|---|---|
| 2020/0160079 A1* | 5/2020 | Reda ...................... | G06N 3/045 |
| 2020/0302288 A1 | 9/2020 | Ren et al. | |
| 2020/0387783 A1* | 12/2020 | Bagherinezhad ........ | G06N 3/08 |
| 2021/0224658 A1* | 7/2021 | Mathew ................... | G06N 3/04 |

OTHER PUBLICATIONS

Choi, Jungwook, et al., "PACT: Parameterized Clipping Activation for Quantized Neural Networks", arXiv:1805.06085, Jul. 17, 2018, 15 pages.
International Search Report and Written Opinion received in Patent Cooperation Treaty Application No. PCT/US2022/052150, dated Mar. 31, 2023, 12 pages.

* cited by examiner

Fixed-Point Quant.

Integer-Only Quant.

Simulated Quant.

Full-Precision.

Effective Weight Range (FP MobileNet V2)

Layer

Weight Range

Fractional Length vs Layer (8-bit MobileNet V2)

Layer

Weight Fractional Length

Signed 8-Bit (Gaussian)

Optimal Fractional Length and Minimum Relative
Error for UnSigned Quant.

Signed 8-bit (Gaussian)

$\sigma = \dfrac{39.27}{2^{FL}}$

Relationship Between Threshold Standard
Deviation and Fractional Length for Signed Quant.

Unsigned 8-Bit (Rectified Gaussian)

Optimal Fractional Length and Minimum Relative
Error for UnSigned Quant.

UnSigned 8-Bit (Rectified Gaussian)

$$\sigma = \frac{69.0}{2^{FL}}$$

Relationship Between Threshold Standard
Deviation and Fractional Length for UnSigned Quant.

ResBlock with Direct Connection

ResBlock with Downsampling.

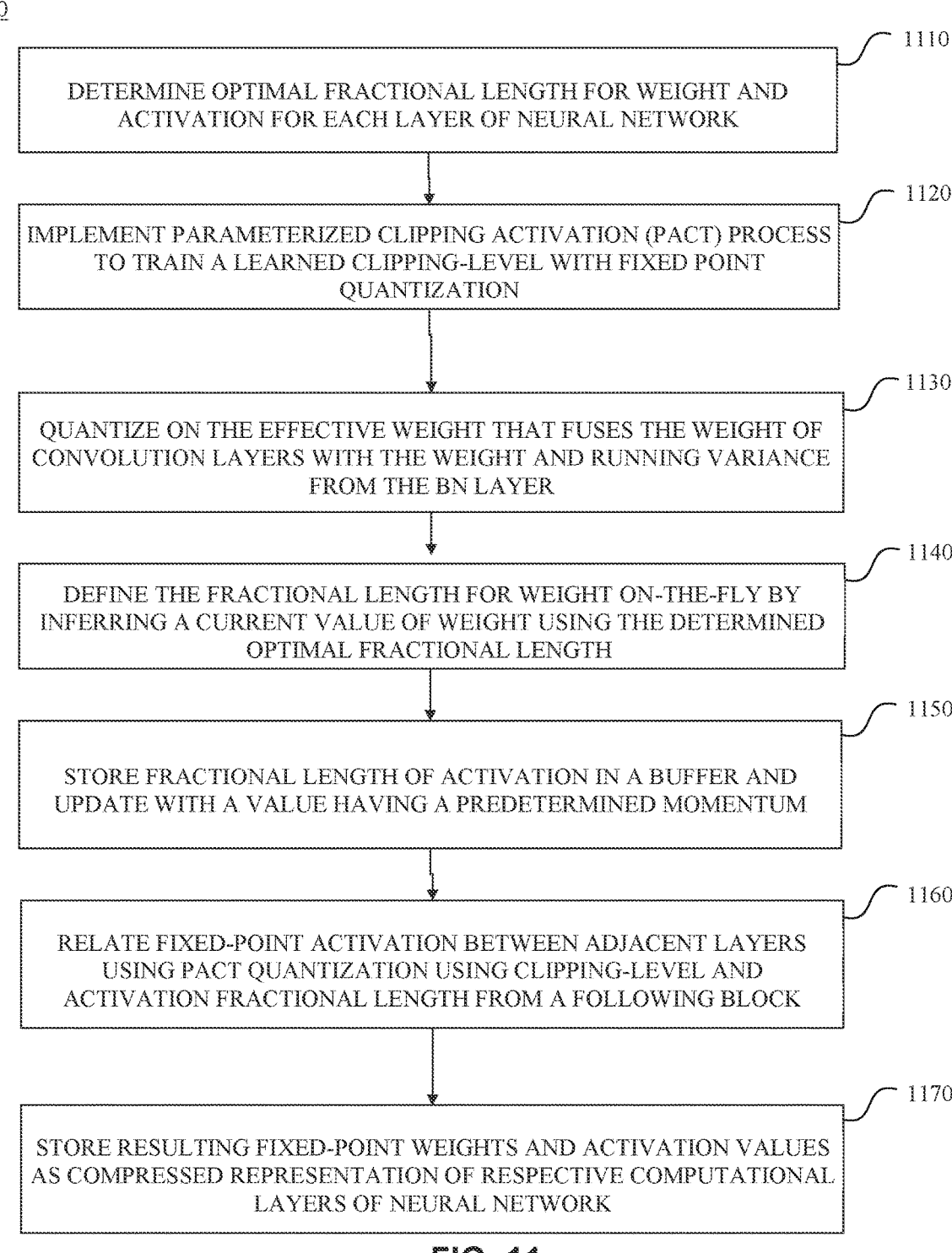

1100

1110
DETERMINE OPTIMAL FRACTIONAL LENGTH FOR WEIGHT AND ACTIVATION FOR EACH LAYER OF NEURAL NETWORK

1120
IMPLEMENT PARAMETERIZED CLIPPING ACTIVATION (PACT) PROCESS TO TRAIN A LEARNED CLIPPING-LEVEL WITH FIXED POINT QUANTIZATION

1130
QUANTIZE ON THE EFFECTIVE WEIGHT THAT FUSES THE WEIGHT OF CONVOLUTION LAYERS WITH THE WEIGHT AND RUNNING VARIANCE FROM THE BN LAYER

1140
DEFINE THE FRACTIONAL LENGTH FOR WEIGHT ON-THE-FLY BY INFERRING A CURRENT VALUE OF WEIGHT USING THE DETERMINED OPTIMAL FRACTIONAL LENGTH

1150
STORE FRACTIONAL LENGTH OF ACTIVATION IN A BUFFER AND UPDATE WITH A VALUE HAVING A PREDETERMINED MOMENTUM

1160
RELATE FIXED-POINT ACTIVATION BETWEEN ADJACENT LAYERS USING PACT QUANTIZATION USING CLIPPING-LEVEL AND ACTIVATION FRACTIONAL LENGTH FROM A FOLLOWING BLOCK

1170
STORE RESULTING FIXED-POINT WEIGHTS AND ACTIVATION VALUES AS COMPRESSED REPRESENTATION OF RESPECTIVE COMPUTATIONAL LAYERS OF NEURAL NETWORK

FIG. 11

FIXED-POINT MULTIPLICATION FOR NETWORK QUANTIZATION

TECHNICAL FIELD

Examples set forth herein generally relate to data compression techniques and, in particular, to methods and systems for compressing data using neural network quantization that uses fixed-point multiplication for deep quantized neural networks.

BACKGROUND

Network quantization is a network compression technique used to reduce the redundancy of deep neural networks. Network quantization reduces the number of distinct network parameter values by quantization in order to save storage space. In addition to performing matrix multiplications, deep learning models also have nonlinear activation layers such as the activation function ReLU and other special layers such as batch normalization (BN) that complicate the quantization process.

Quantization incorporates techniques for performing computations and storing tensors at lower bandwidths than floating point precision. A quantized model executes some or all of the operations on tensors with integers rather than floating point values, which allows for a more compact representation of a model and enables the use of high performance vectorization operations on many hardware platforms. Quantization is particularly useful at the time of inference since it saves inference computation cost without sacrificing too much inference accuracy. The compression provided by network quantization is useful in a number of applications including image compression, machine learning model compression, and the like.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 11 illustrates a flow chart of a sample training technique for neural network quantization with fixed-point numbers, where the formats of weight and activation in each layer are determined based on the optimal fractional length during training in an example;

DETAILED DESCRIPTION

Figure 1:
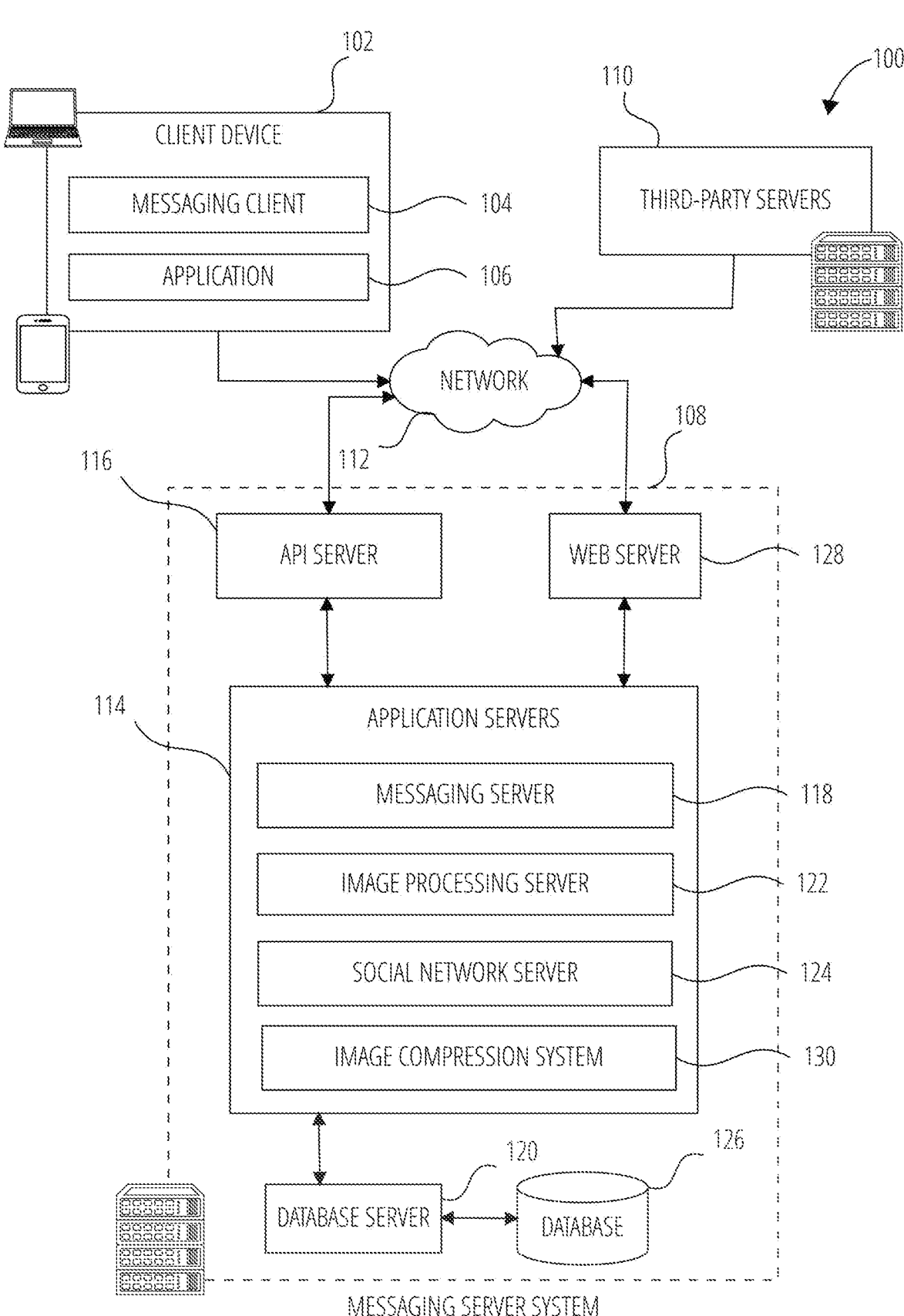
FIG. 1 is a block diagram showing an example messaging system for exchanging data over a network in which the present disclosure may be deployed, in accordance with some examples.

This disclosure includes methods and a system for compressing data using neural network quantization. Neural network quantization is a compression technique to reduce memory footprint and to save energy consumption and thus to enable real-time inference. However, existing quantization approaches still require 32-bit signed integer (INT32) or full-precision multiplication during inference for scaling or dequantization. These high-precision computations help reduce the performance gap between the quantized and full-precision models but cause extra operation after convolution layers, therefore leading to non-negligible costs in terms of memory, speed, and energy. To tackle these issues, a quantization framework is provided with fixed-point 8-bit multiplication employed for deep quantized neural networks.

This disclosure describes the advantages of fixed-point multiplication with different formats of fixed-point numbers and the statistical behavior of the associated fixed-point numbers. Based on the statistical and algorithmic analysis, different fixed-point formats for weight and activation from different layers are applied and an algorithm is described to automatically determine the formats during training. A previous quantization algorithm, namely parameterized clipping activation (PACT) is reformulated using fixed-point arithmetic. The proposed method for quantization fine-tuning and the fixed-point approach are unified to achieve comparable and even better performance, when compared not only to existing quantization techniques that involve INT32 multiplication or floating point arithmetic but also to the full-precision counterparts, achieving state-of-the-art model performance.

The neural network quantization technique may be used to quantize large models, including the models used for image generation and classification, to produce very small models with improved performance. In a sample configuration, the neural network quantization technique described herein may be used to improve the performances of Lenses, such as Snapchat Lenses available from Snap, Inc., of Santa Monica, California, including but not limited to FaceCraft Lenses and Anime Lenses. The techniques described herein also may be used to help the machine learning models run faster on the hardware of electronic eyewear devices such as Spectacles™ available from Snap, Inc. of Santa Monica, California.

The systems and methods described herein thus relate to a compression system that can quantize large models to obtain quantized neural networks that have comparable or even better performance than the full-precision counterparts. The systems and method described herein include techniques for training a neural network having a plurality of computational layers of nodes with associated weights and activations for each computational layer in fixed-point formats, the plurality of computational layers of nodes including at least one convolution layer and at least one batch normalization (BN) layer. The method includes determining an optimal fractional length for a weight and activation for at least two computational layers of the neural network; training a learned clipping-level $\alpha$ with fixed-point quantization using a parameterized clipping activation (PACT) process for the at least two computational layers of the neural network; quantizing on an effective weight that fuses a weight of the at least one convolution layer of the neural network with a weight and running variance from the at least one BN layer; determining a fractional length for weight of the at least two computational layers of the neural network from a current value of weight using the determined optimal fractional length for the weight of the at least two computational layers of the neural network; relating a fixed-point activation between two adjacent computational layers of the at least two computational layers of the neural network using a PACT quantization of the clipping-level $\alpha$ and an activation fractional length (FL) from at least one node in a following computational layer of the neural network; and storing resulting fixed-point weights and activation values as a compressed representation of the respective computational layers of the neural network.

Determining the optimal fractional length for the weight and activation for the at least two layers of the neural network may include determining the optimal fractional length (FL*) from a standard deviation for signed quantization and for unsigned quantization as:

$$\text{Signed: } FL^* \approx \left\lfloor \log_2 \frac{40}{\sigma} \right\rfloor, \tag{1}$$

$$\text{Unsigned: } FL^* \approx \left\lfloor \log_2 \frac{70}{\sigma} \right\rfloor.$$

where $\sigma$ is a threshold standard deviation value on a log scale. Also, training the learned clipping-level $\alpha$ with fixed-point quantization using a parameterized clipping activation (PACT) process for the at least two computational layers of the neural network may comprise calculating PACT(x) for input x as:

$$PACT(x) = \frac{2^{FL}\alpha}{2^{WL} - 1} \text{fix\_quant}\left(\frac{2^{WL} - 1}{2^{FL}\alpha} x\right), \tag{4}$$

where FL is a fractional length for a fixed-point number, WL is a word length for the fixed-point number, and fix_quant is a quantization function:

$$\text{fix\_quant}(x) = \frac{1}{2^{FL}} \text{round}\left(\text{clip}\left(x \cdot 2^{FL}, 0, 2^{WL} - 1\right)\right), \tag{2}$$

and clip is a clipping function.

In addition, relating a fixed-point activation between two adjacent computational layers of the neural network using the PACT quantization of the clipping-level $\alpha$ and the activation FL from at least one node in a following computational layer of the neural network may include applying PACT to relate the activation between the two adjacent computational layers of the neural network as:

$$q_i^{(l+1)} = \text{fix\_quant}\left(\underbrace{\sum_{j=1}^{n^{(l)}} \frac{\gamma_i^{(l)}}{\eta_{\theta x}^{(l+1)}} W_{ij}^{(l)} q_j^{(l)}}_{\text{Effective Weight}} + \underbrace{\left(\frac{1}{\eta_{\theta x}^{(l+1)}}\left(\beta_i^{(l)} - \frac{\gamma_i^{(l)}}{\sigma_i^{(l)}}\mu_i^{(l)}\right)\right)}_{\text{Effective Bias}}\right), \tag{6}$$

where q is the fixed-point activation, W is a full-precision weight of the at least one convolution layer, i and j are spatial indices, n is a total number of multiplications, the superscript (l) indicates an l-th block including the at least one convolution layer and at least one BN layer, $\gamma$, $\beta$, $\sigma$, and $\mu$ are the learned weight, bias, running standard deviation, and running mean for the at least one BN layer, respectively, WL is the word length for a fixed-point number for all layers, fix_quant is a quantization function:

$$\text{fix\_quant}(x) = \frac{1}{2^{FL}} \text{round}\left(\text{clip}\left(x \cdot 2^{FL}, 0.2^{WL} - 1\right)\right), \tag{2}$$

and $\eta_{fix}$ is a fix scaling factor:

$$\eta_{fix} = \frac{2^{FL}\alpha}{2^{WL} - 1}. \tag{5}$$

where FL is the fractional length for the fixed-point number for all computational layers.

In some examples, the neural network is adapted to classify an image and is trained to compress parameters of the neural network by applying the stored fixed-point weights and activation values for the respective computational layers of the neural network.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, a social network server 124 and an image compression system 130. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
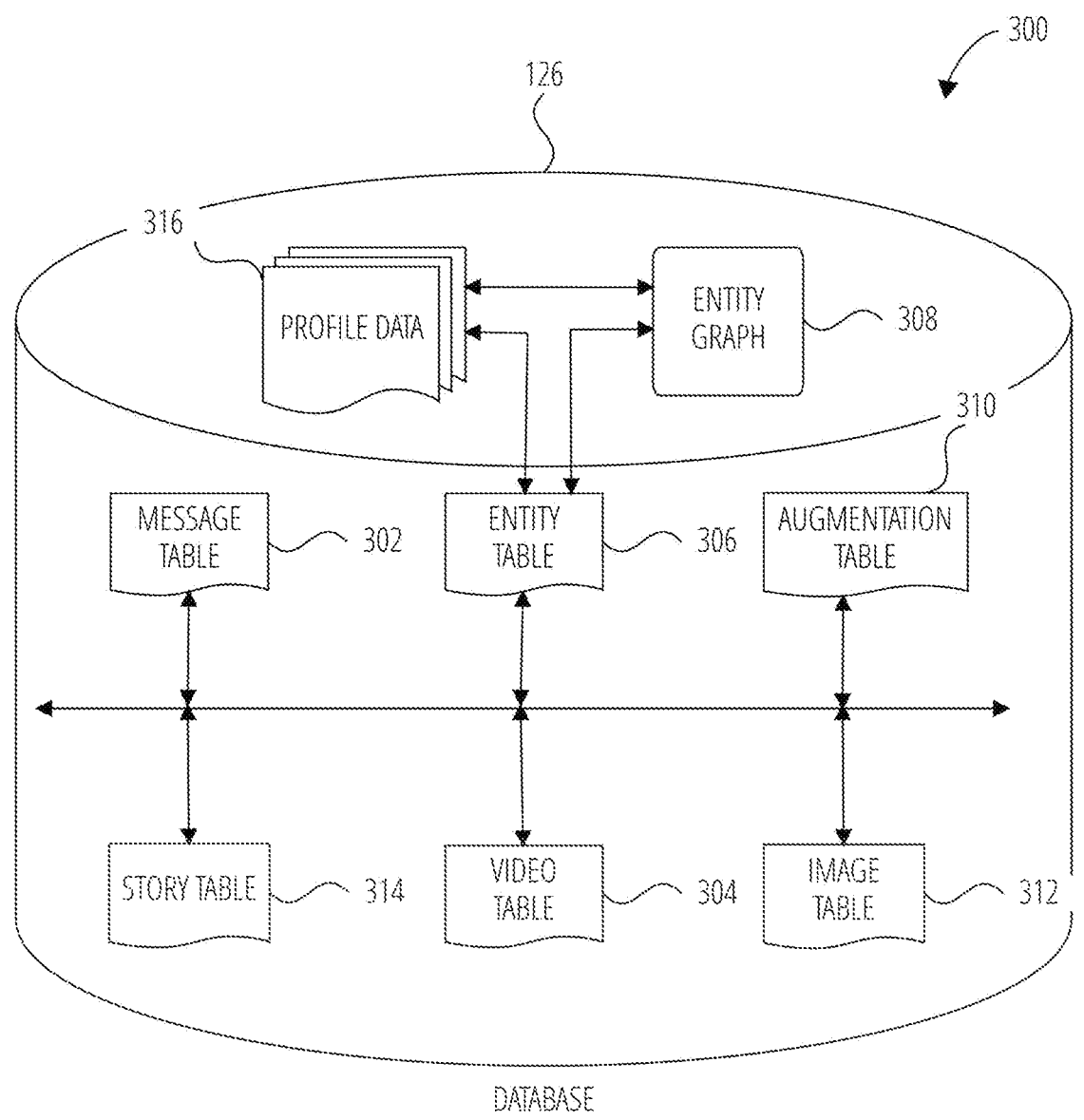
FIG. 3 is a schematic diagram illustrating data structures that may be stored in the database of the messaging server system, according to certain examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

The image compression system 130 searches a teacher network to generate a computationally efficient, student network. The image compression system 130 leverages a residual block that is specially configured to generate a search space from which an efficient student network may be found.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .* ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110, for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
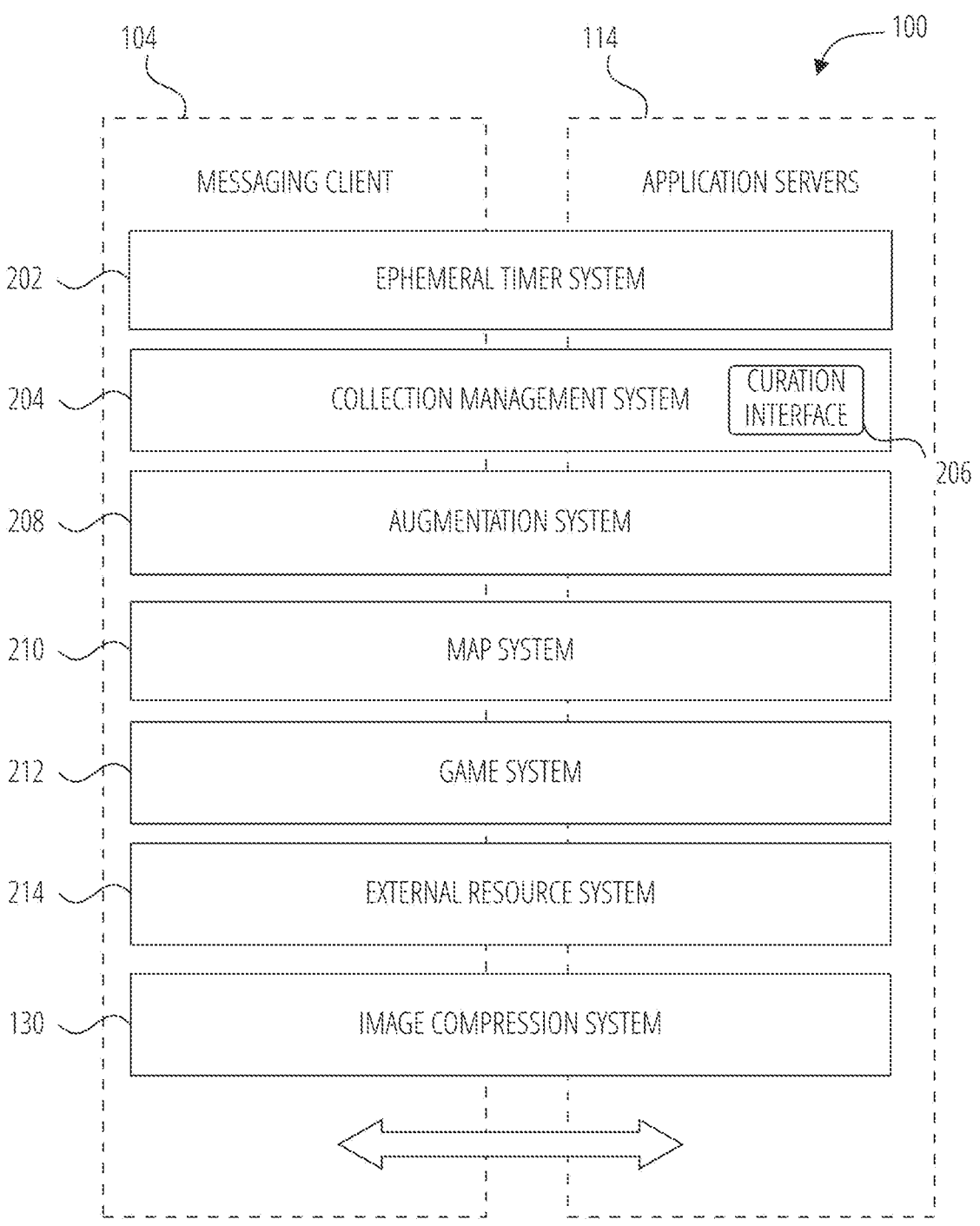
FIG. 2 is a block diagram illustrating further details regarding the messaging system of FIG. 1, in accordance with some examples, which has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, an external resource system 214, and an image compression system 130.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The image compression system 130 searches a teacher network to generate a computationally efficient, student network. The image compression system 130 leverages a residual block that is specially configured to generate a search space from which an efficient student network may be found. Aspects of the image compression system 130 may exist on the messaging client 104 and other aspects may exist on the application servers 114. In some examples, the image compression system 130 operates exclusively on the messaging client 104.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message generation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to produce transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content generation user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The generation of a particular collection may be initiated by a particular user (e.g., each user for which a record is maintained in the entity table 306). A user may generate a "personal story" in the form of a collection of content that has been generated and sent/broadcast by that user. To this end, the user interface of the messaging client 104 may include an icon that is user-selectable to enable a sending user to add specific content to his or her personal story.

A collection may also constitute a "live story," which is a collection of content from multiple users that is generated manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
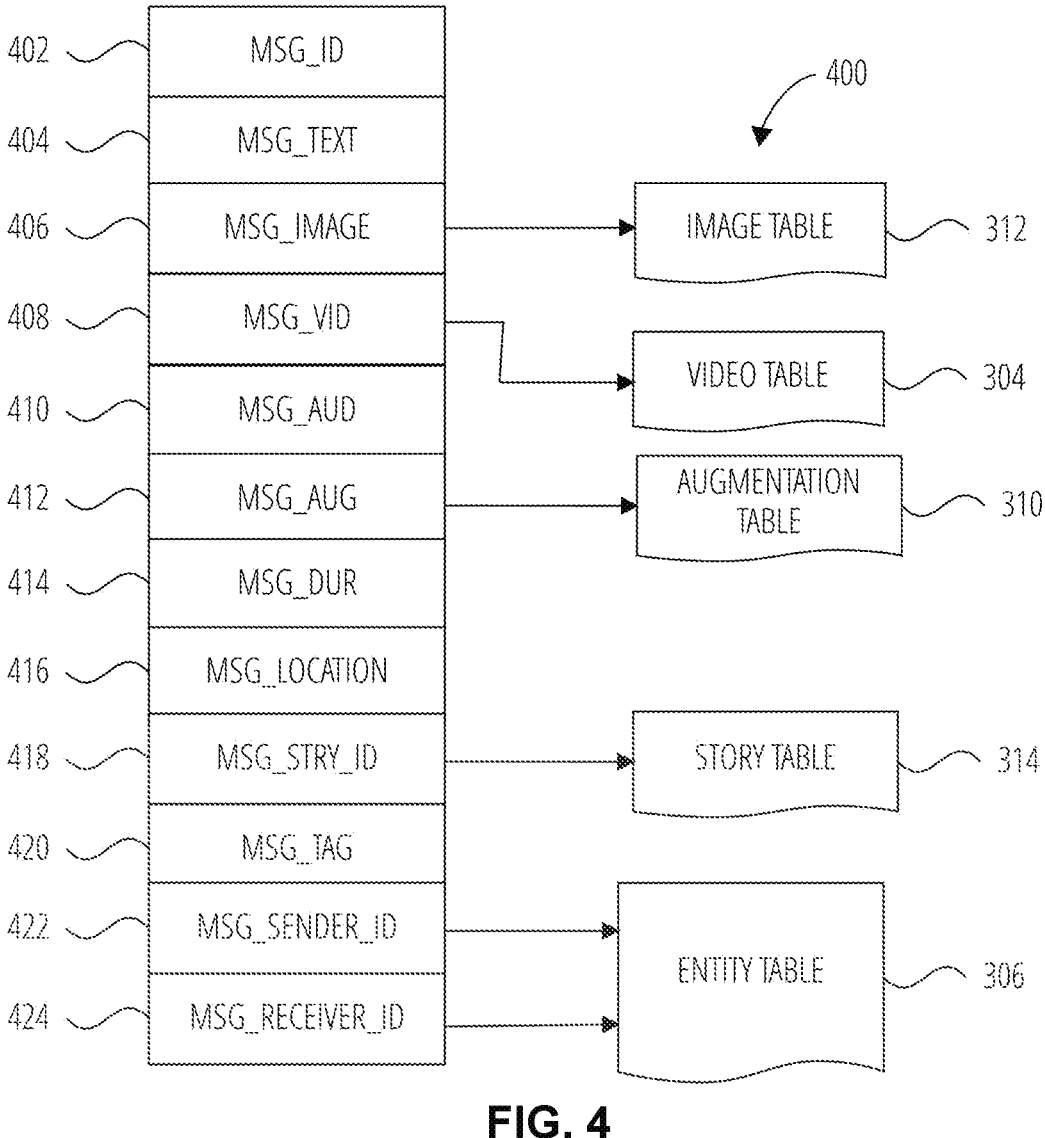
FIG. 4 is a schematic diagram illustrating a structure of a message, according to some examples, generated by a messaging client for communication to a further messaging client or the messaging server.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
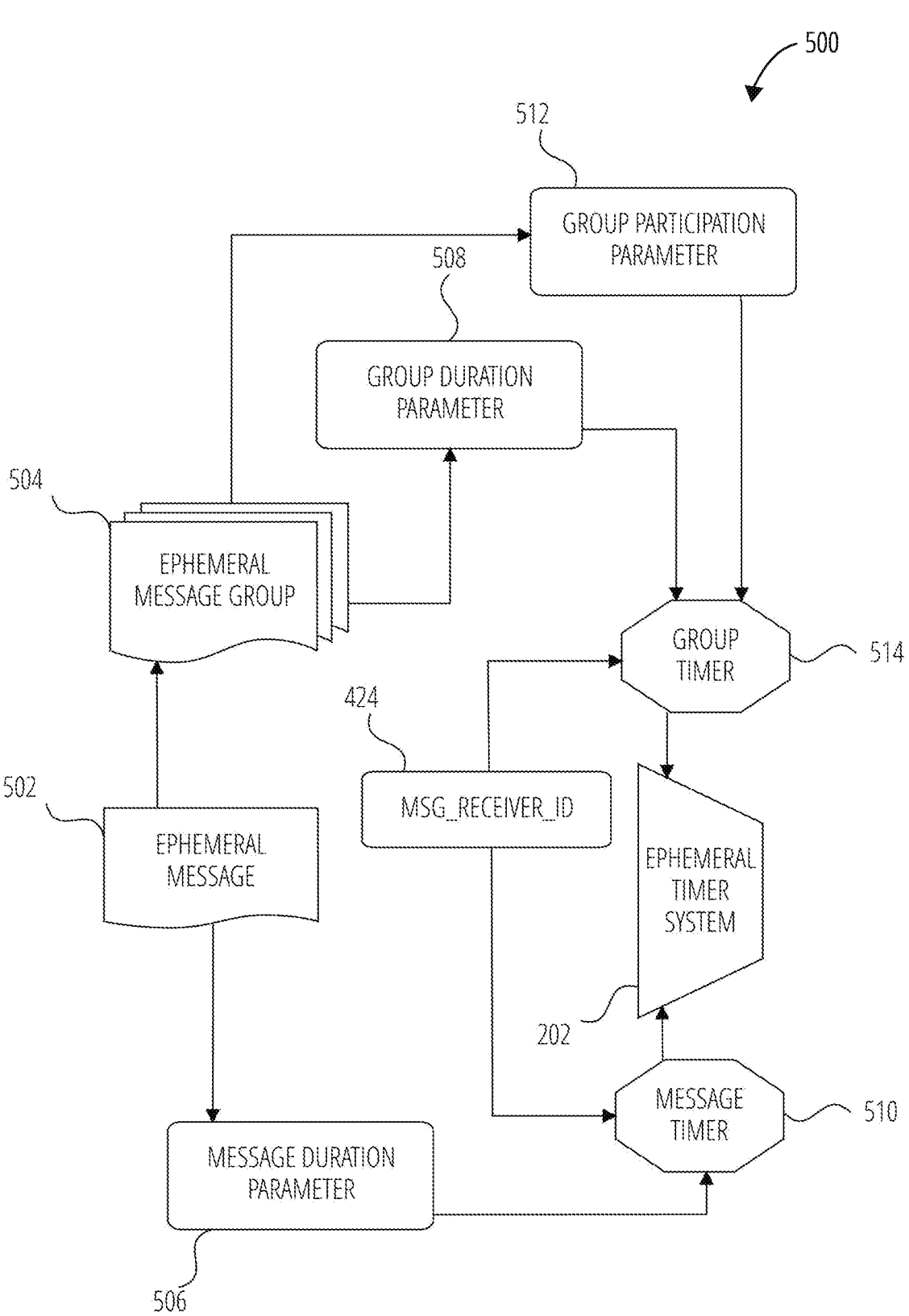
FIG. 5 is a schematic diagram illustrating an access-limiting process in terms of which access to content or a content collection that may be time-limited, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and generation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a generator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Neural Network Quantization with Fixed-Point Multiplication

Messaging systems of the type described above may be used to exchange Lenses, such as Snapchat Lenses available from Snap, Inc., of Santa Monica, California, including but not limited to FaceCraft Lenses and Anime Lenses. Lenses and other applications may be implemented using large machine learning (ML) models that may run on servers as well as the hardware of electronic devices such as a user's smartphone or the hardware of electronic eyewear devices such as Spectacles™ available from Snap, Inc. of Santa Monica, California. Due to the limited storage and processing capacity of such devices, it is desirable to compress the ML models used to, for example, identify images or object within images, and to compress the stored images to improve processing and storage efficiencies of such devices. For example, a neural network may be used with such messaging systems where the neural network includes at least one convolutional layer and at least one BN layer with different weights and activations for each BN layer.

Real-time inference on resource-constrained and efficiency-demanding platforms has long been desired and extensively studied, resulting in significant improvement on the trade-off between efficiency and accuracy. As a model compression and inference accelerating technique, quantization is promising in comparison with others such as network pruning and slimming, as it is able to achieve a large compression ratio and is computationally friendly for integer-only hardware. The latter one is especially important given that many types of hardware, e.g., most brands of digital signal processors (DSPs), only support integer or fixed-point arithmetic for accelerated implementation and are not able to deploy models with floating-point operations. However, due to quantization error, the performance degradation, e.g., classification accuracy drop, is usually considerable for quantized models, which restricts its wide application.

To address this challenge, many approaches have been proposed, which can be categorized into simulated quantization, integer-only quantization, and fixed-point quantization. FIGS. 6A-6D illustrate a comparison among a full-precision model (presented in FIG. 6A) and different quantization settings: (FIG. 6B) simulated quantization; (FIG. 6C) integer-only quantization; and (FIG. 6D) fixed-point quantization for one convolutional layer. Note the combination of last two operations in integer-only quantization is termed as dyadic scaling. For simulated quantization, trainable clipping-levels may be used with scaling techniques on activations and/or gradients to facilitate training for the quantized models. However, some operations, such as batch normalization (BN), are conducted with full-precision to stabilize training, which limits the practical application on integer-only hardware. Meanwhile, integer-only quantization, where the model inference can be implemented with integer multiplication, addition and bit shifting, has shown significant progress in recent studies. Albeit floating-point operations are removed to enable the model running on devices with limited support of operation types, INT32 multiplication is still indispensable for these methods. On the other hand, fixed-point quantization, which also applies low-precision logic for arithmetic, does not require INT32 multiplication or integer division. For example, to replace multiplication by bit shifting, trainable power-of-2 scale factors may be utilized to quantize the model.

The methods described herein also adopt fixed-point quantization but differ from previous methods in three major aspects. First, the methods described herein conduct statistical analysis on fixed-point numbers, based on which is related the optimal fixed-point format with standard deviation of the value to quantize to get the minimum error. Second, the advantage from parameterized clipping activation (PACT) is unified with fixed-point arithmetic. Third, quantization fine-tuning methods are used for different models. The result is a framework with only fixed-point 8-bit multiplication employed for network quantization. The problem with fixed-point numbers is described, where only 8-bit integer (INT8) multiplication is involved, without any INT32 multiplication, neither floating-point nor fixed-point types. The description herein focuses on 8-bit quantization, which is the most widely supported case for different devices and is typically sufficient for both efficiency and performance requirements. It will be appreciated that quantization of other bit formats may also implement the techniques described herein.

In sample configurations, an 8-bit fixed-point number is able to represent a wide range of values with negligible relative error, once the format is properly chosen. This characteristic enables fixed-point numbers a much stronger representative capability than the integer values. The described method is based on empirical analysis to determine the fixed-point format, also known as fractional length, for weights and activations using their variance. The method is achieved by analyzing the statistical behaviors of fixed-point values of different formats, especially those quantized from random variables with normal distribution of different variances. The analysis reveals the relationship between relative quantization error and variance, which further helps to build an approximated formula to determine the fractional length from the variance. Also, a training algorithm for fixed-point models is developed by unifying fixed-point quantization and parameterized clipping activation (PACT) (Choi et al., "PACT: Parameterized Clipping Activation for Quantized Neural Networks," arXiv preprint arXiv: 1805.06085, 2018). The impact of fractional length sharing for residual blocks may be shown, which is also important to obtain good performance for quantized models.

The approach described herein is validated for various models, including MobileNet V1/V2 and ResNet18/50 on ImageNet for image classification, and better performance than existing methods with 32-bit multiplication is demonstrated. A fine-tuning method is also integrated to train quantized models from pre-trained full-precision models with the method described herein for further verification.

As will be appreciated by those skilled in the art, quantization is one of the most widely used techniques for neural network compression with two types of training strategies: Post-Training Quantization directly quantizes a pre-trained full-precision model, while Quantization-Aware Training uses training data to optimize quantized models for better performance. The description herein focuses on the latter one, which is explored in several directions. One area uses uniform-precision quantization where the model shares the same precision. Another direction studies mixed-precision that determines bit-width for each layer of the neural network through searching algorithms, aiming at better accuracy-efficiency trade-off. There is also a binarization network, which only applies 1-bit. Despite the fact that quantization helps reduce energy consumption and inference latency, it is usually accompanied by performance degradation. To alleviate this problem, several methods are proposed.

One type of effort focuses on simulated quantization. The strategy is to leave some operations, e.g., batch normalization (BN), in full-precision for the stabilized training of quantized models. Nevertheless, these methods limit the application of the quantized models on resource demanding hardware, such as digital signal processing (DSP), where full-precision arithmetic is not supported for accelerated computing. To eliminate floating-point operation from the quantized model completely, integer-only quantization techniques emulate the full-precision multiplication by 32-bit integer multiplication followed by bit shifting. However, the calculation of INT32 multiplication requires one more operation, which results in extra energy and higher latency. Recent work proposes to restrict all scaling factors as power-of-2 values for all weights and activations, which belongs to fixed-point quantization methods. This enables the model to only incorporate INT8 or even 4-bit integer (INT4) multiplications, followed by INT32 bit shifting. However, there still lacks in the prior art a thorough study on the benefits of using fixed-point arithmetic.

In conventional quantization models, the power-of-2 scaling factors are directly determined from the training data without theoretical analysis and guidance. In the methods described herein, a more extensive analysis is provided, especially on the potential and theoretical principle of using fixed-point values for quantized models. With proper analysis and design, a model quantized with only INT8 multiplication involved is able to achieve comparable and even better performance than the integer-only methods implemented with INT32 multiplication.

Fixed-Point Representation

Fixed-point multiplication may be analyzed for the distribution of weight from different layers of the neural network in a well-trained full-precision model. The statistical property of fixed-point numbers are investigated below to demonstrate the potential of approximating full-precision values by 8-bit fixed-point numbers with different formats. The relationship between standard deviation of random variables and the optimal fixed-point format with the smallest quantization error is demonstrated, and an approximated formula relating the standard deviation and fixed-point format is derived, which is verified empirically and employed in algorithms.

Advantages of Fixed-Point Arithmetic

A fixed-point number is characterized by its format, which includes both the word length indicating the whole bit-width of the number and the fractional length (FL) characterizing the range and resolution of the represented values. Fixed-point arithmetic, especially fixed-point multiplication, is efficiently and widely utilized for applications in, e.g., digital signal processing. Compared with integer or floating-point multiplication, fixed-point multiplication has two major characteristics: First, multiplying two fixed-point numbers is more efficient than multiplying two floating-point numbers, especially on resource-constrained devices such as DSP. Second, it is more powerful than its integer counterpart due to its versatility and the representative ability of fixed-point numbers (there can be tens of different implementations for fixed-point multiplication but only one for integer and floating-point one). This efficiency and versatility makes fixed-point quantization a more appealing solution than integer-only quantization.

Figures 6A, 6B, 6C, 6D:
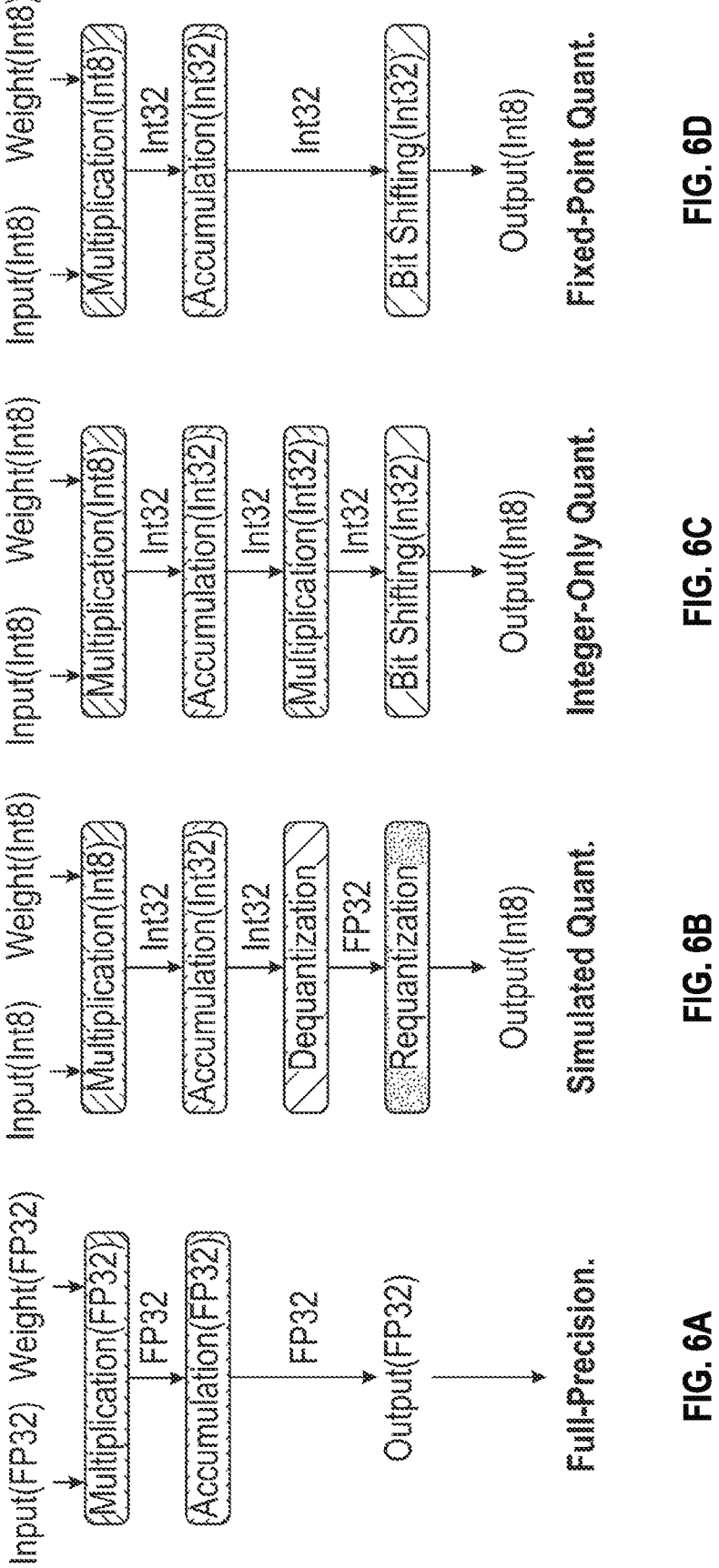
FIGS. 6A, 6B, 6C, and 6D illustrate a comparison among full-precision, simulated quantization, integer-only quantization, and fixed-point quantization, respectively.
Figure 7A:
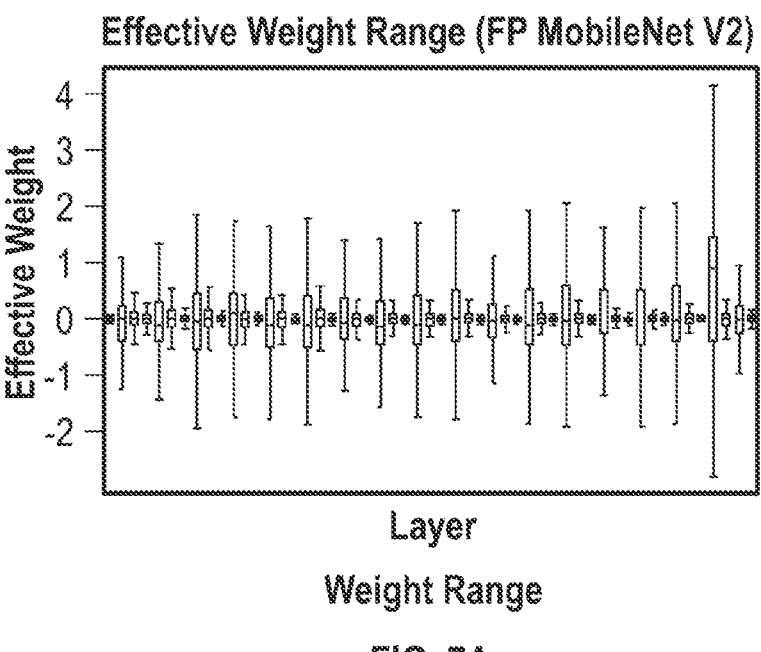
FIG. 7A illustrates that the scales of weights from different layers in a pre-trained full-precision model can vary in orders, ranging from less than 0.1 to near 4.
Figure 7B:
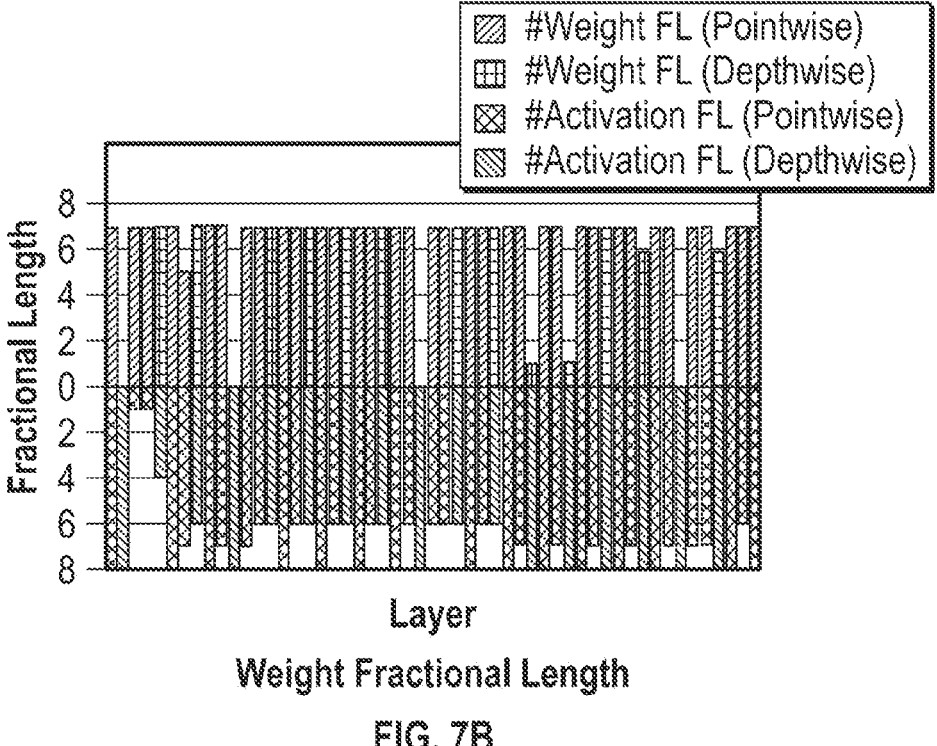
FIG. 7B illustrates that for a well-trained MobileNet V2 with 8-bit fixed-point numbers, the fractional lengths for weights and activations vary from layer to layer.

Specifically, as shown in FIG. 7A, the scales of weights from different layers of the neural network in a pre-trained full-precision model can vary in orders, ranging from less than 0.1 to near 4. FIG. 7A illustrates the value range of effective weight for a pre-trained full-precision (FP) model. Direct quantization with only integer inevitably introduce considerable quantization error, unless more precision and more operations are involved, such as using INT32 multiplication together with bit shifting for scaling as shown in FIG. 6C. On the other hand, employing fixed-point numbers has the potential to reduce quantization error without relying on high-precision multiplication if weights and activations from different layers of the neural network have the extra degree of using different formats during quantization. Indeed, as shown in FIG. 7B for a well-trained MobileNet V2 with 8-bit fixed-point numbers, the fractional lengths for weights and activations vary from layer to layer of the neural network. This raises the question of how to determine the formats for each layer of the neural network. This is explained below for 8-bit fixed-point models.

Statistical Analysis for Fixed-Point Format

Figure 8A:
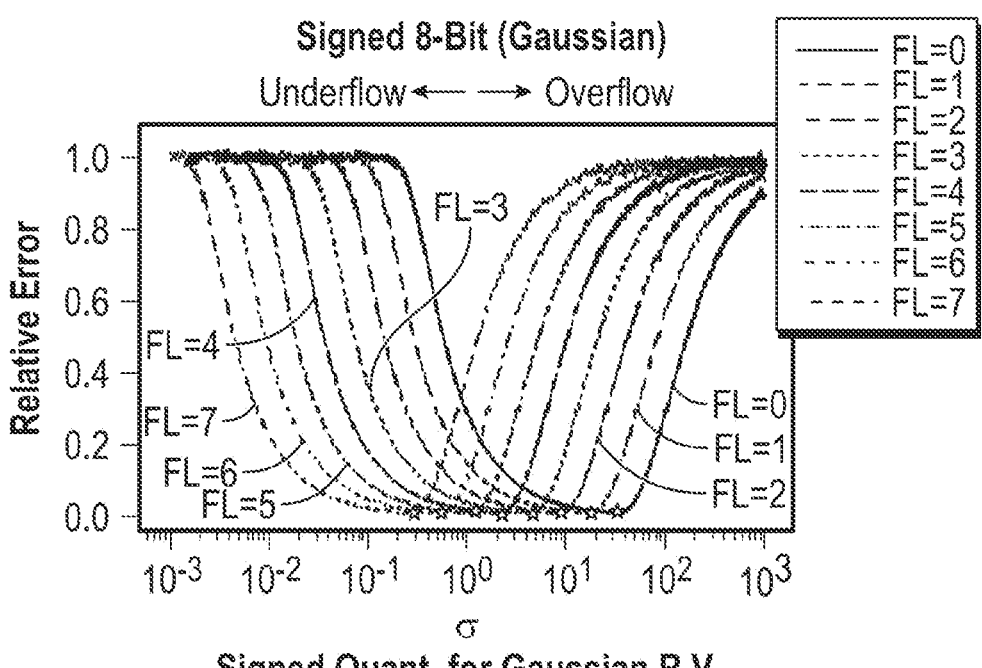
FIG. 8A illustrates the relative quantization error with 8-bit fixed-point values using signed quantization for Gaussian random variables.
Figure 8B:
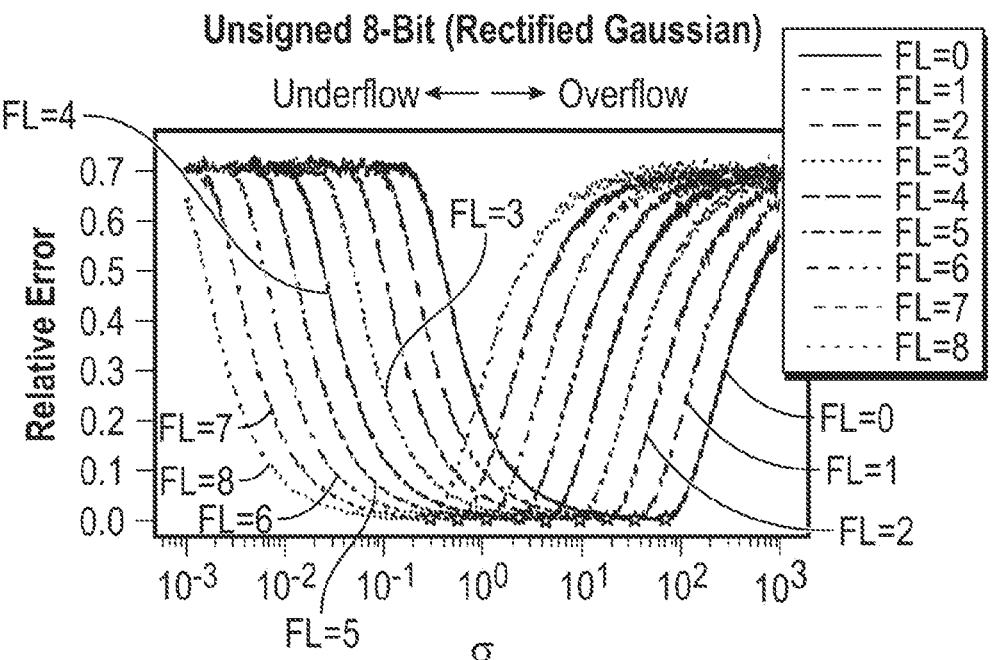
FIG. 8B illustrates the relative quantization error with 8-bit fixed-point values using unsigned quantization for rectified Gaussian random variables.

For a predefined bit-width, an integer, which is a special case of fixed-point numbers with zero fractional length, has a predefined set of values that it can take, which severely constrains the potential of integer only quantization. On the other hand, fixed-point numbers, with an extra degree of freedom, i.e., the fractional length, is able to represent a much wider range of full-precision values by selecting proper format, and thus they are more suitable for quantization. As an example, FIG. 8 illustrates the relative quantization error with 8-bit fixed-point values using different formats for a set of random variables, which are sampled from normal distributions (both signed and unsigned, with the latter processed by the non-linear activation function ReLU before quantization) with zero-mean and different standard deviations $\sigma$. FIG. 8 represents the potential for 8-bit signed and unsigned fixed-point values with different formats. FIG. 8 plots the relationship between relative quantization error and the standard deviation for different fixed-point formats. Both are experimented on zero-mean Gaussian random variables with the non-linear activation function ReLU applied on the right for signed quantized for Gaussian random variables (FIG. 8A) and for unsigned quantized for rectified Gaussian random variables (FIG. 8B).

From experiments, the following two observations may be made:

Observation 1: Fixed-point numbers with different formats have different optimal representing regions. This can be seen from FIG. 8, where the minimum relative error and the corresponding standard deviation (annotated as a star) for different format varies for different fractional lengths, which is reasonable because the format controls the value magnitude and the representation resolution (the least significant bit). In other words, the different layers in a model may have different presentation ranges, and the most appropriate fixed-point format may be selected for each layer of the neural network based on the fractional lengths of that layer.

Observation 2: Larger fractional lengths are more robust to represent smaller numbers, while smaller fractional lengths are more suitable for approximating larger full-precision ones. For a given variance, using fixed-point numbers with a small fractional length has the risk of underflow, while quantization with a bigger fractional length might cause overflow issue. Specifically, integers (see curves FL=0 in FIGS. 8A and 8B)

are much more prone to underflow issues and have much larger relative errors for small enough values to quantize.

Thus, there are different presentation ranges for different layers, and the most appropriate fixed-point format is identified for each layer.

Choosing Optimal Fixed-Point Format

Figure 9A:
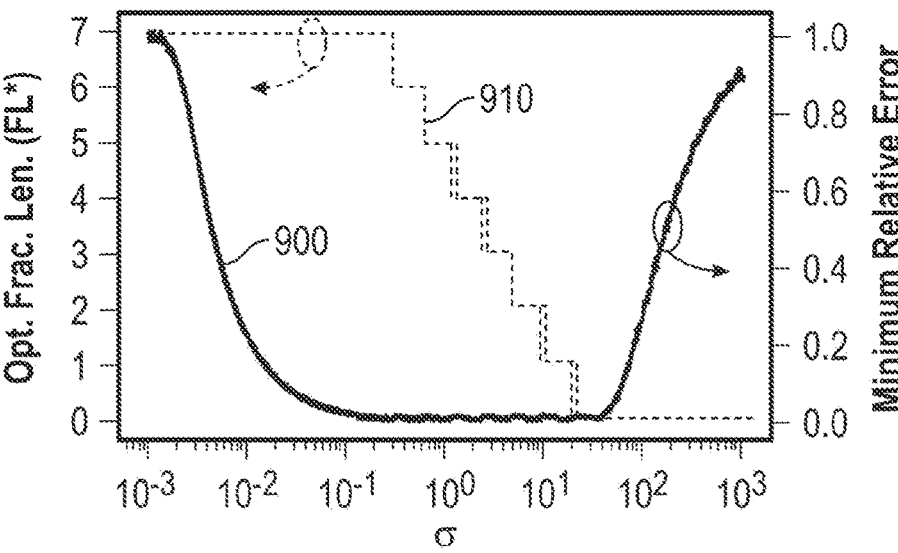
FIG. 9A illustrates the optimal fractional length and minimum relative quantization error against standard deviation for a signed 8-bit fixed-point quantization for Gaussian and rectified random variables.
Figure 9B:
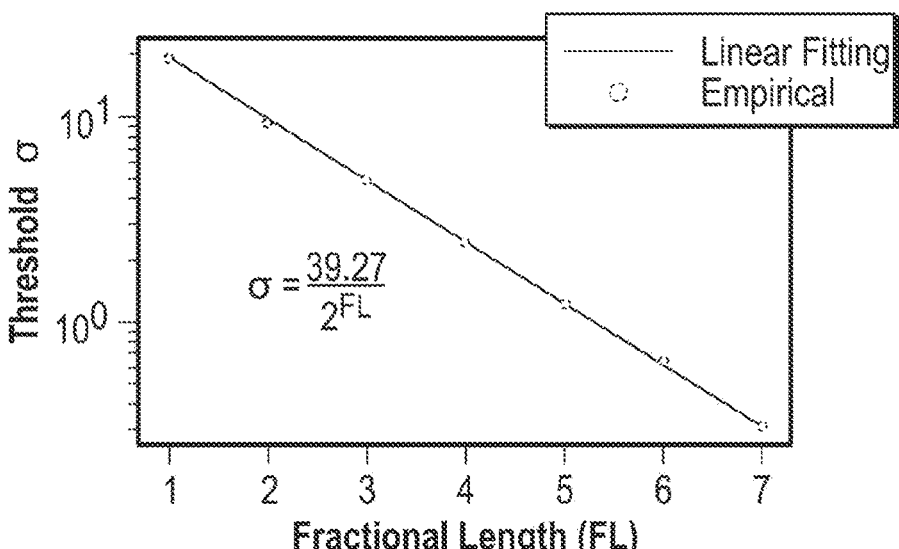
FIG. 9B illustrates the relationship between the threshold standard deviation and fractional length for signed quantization.
Figure 9C:
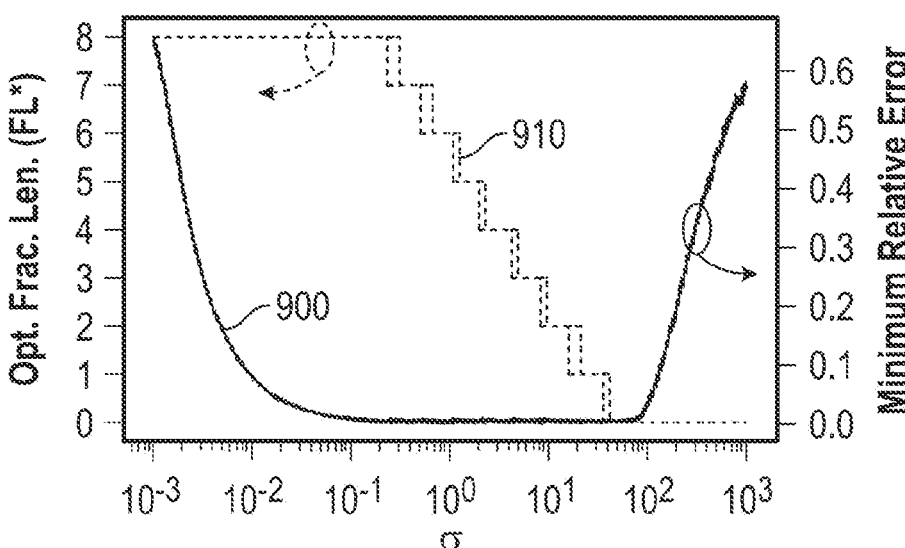
FIG. 9C illustrates the optimal fractional length and minimum relative quantization error against standard deviation for an unsigned 8-bit fixed-point quantization for Gaussian and rectified random variables.
Figure 9D:
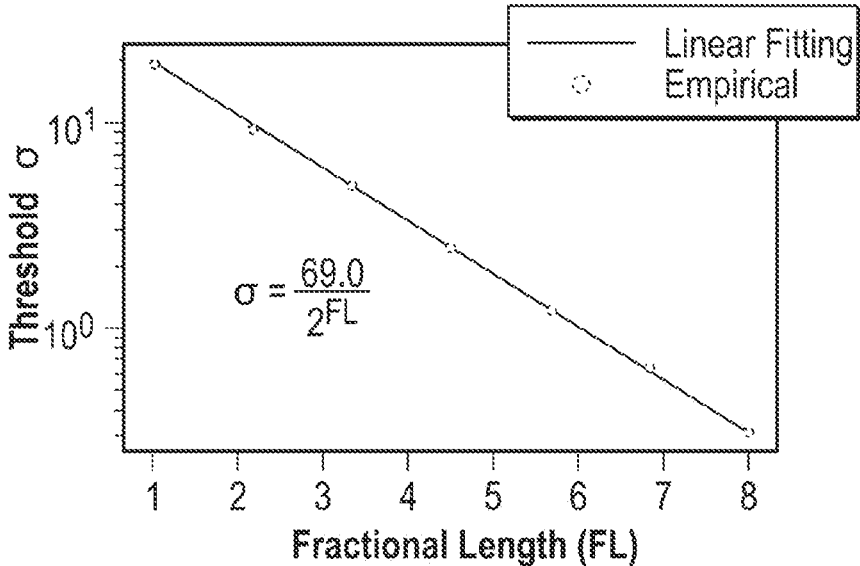
FIG. 9D illustrates the relationship between the threshold standard deviation and fractional length for unsigned quantization.

To determine whether it is possible to achieve small fixed-point quantization error for a wide range of full-precision values by always using the optimal fractional length corresponding to the smallest relative error, the smallest possible relative error amongst all candidate fixed-point formats is plotted against the standard deviation. FIGS. 9A-9D illustrate determining the optimal fractional length from the standard deviation. FIG. 9A illustrates the optimal fractional length and minimum relative quantization error against standard deviation for a signed 8-bit fixed-point quantization for Gaussian and rectified random variables, while FIG. 9C illustrates the optimal fractional length and minimum relative quantization error against standard deviation for an unsigned 8-bit fixed-point quantization for Gaussian and rectified random variables. FIG. 9B illustrates the relationship between the threshold standard deviation and fractional length for signed quantization, while FIG. 9D illustrates the relationship between the threshold standard deviation and fractional length for unsigned quantization. As shown at 900 from FIG. 9A and FIG. 9C, for zero-mean normal distribution, by always choosing the optimal fixed-point format, a relative quantization error smaller than 1% for variance with a range of order of at least around 3 may be achieved. For example, for signed quantization, the variance can range from 0:1 to around 40 to achieve less than 1% error, and for unsigned quantization, the variance can range from 0:1 to 100. Experiments have verified the presumption that using fixed-point values with the optimal formats is able to achieve negligible quantization error.

To determine if there is a simple way to determine the optimal fractional length, experiments were conducted. The optimal fractional length from the statistics of the full-precision values were plotted against the standard deviation, as shown at 910 in FIG. 9A and FIG. 9C. The threshold $\sigma$ value corresponding to the jumping point was found to be almost equidistant on the log scale of the standard deviation. This is expected as the representing region of different formats are differed by a factor of 2's exponents. Plotting the threshold standard deviation (on a log-scale) against the corresponding optimal fractional length (FIG. 9B and FIG. 9D), it is shown that their relationship is almost linear, leading to the following semi-empirical approximating formulas to determine the optimal fractional length FL* from the standard deviation:

$$\text{Signed: } FL^* \approx \left\lfloor \log_2 \frac{40}{\sigma} \right\rfloor, \tag{1}$$

$$\text{Unsigned: } FL^* \approx \left\lfloor \log_2 \frac{70}{\sigma} \right\rfloor.$$

In the following, unless specifically stated, Equation (1) is used to determine the fractional length for both weight and activation quantization for each selected layer.

Training Neural Network Quantization with Fixed-Point Numbers

A training technique for neural network quantization with fixed-point numbers, where the formats of weight and activation in each layer of the neural network are determined based on Equation (1) during training, includes first analyzing how to unify PACT and fixed-point quantization and introducing how to quantize weight and activation, especially updating for BN running statistics and fractional lengths. The weights between adjacent layers of the neural network may be related to quantize for the effective weights, but the problem of residual connecting blocks also needs to be addressed.

Unifying PACT and Fixed-Point Quantization

To quantize a positive value x with unsigned fixed-point number of format (WL; FL), where WL and FL denotes word length and fractional length for the fixed-point number, respectively, the quantization function fix_quant is defined as:

$$\text{fix\_quant}(x) = \frac{1}{2^{FL}} \text{ round } \left( \text{clip } \left( x \cdot 2^{FL}, 0, 2^{WL} - 1 \right) \right), \quad (2)$$

where clip is the clipping function, and $0 \leq FL \leq WL$ for unsigned fixed-point numbers. It is noted that fixed-point quantization has two limitations: overflow, which is caused by clipping into its representing region, and underflow, which is introduced by the rounding function. These two both introduce approximating error. To minimize the error, the optimal fractional length for each layer of the neural network is determined based on the analysis for choosing the optimal fixed-point format as described above.

To achieve a better way to quantize a model using fixed-point numbers, PACT was analyzed. PACT clips on the full-precision value with a learned clipping-level $\alpha$ before quantization as follows:

$$\text{PACT}(x) = \frac{\alpha}{M} \text{ round } \left( \frac{M}{\alpha} \text{ clip } (x, 0, \alpha) \right), \quad (3)$$

where M is a predefined scale factor mapping the value from [0; 1] to [0;M]. The formal similarity between Equation (2) and Equation (3) enables one to derive the relationship between PACT and fixed-point quantization as follows:

$$\text{PACT}(x) = \frac{\alpha}{M} \text{round} \left( \frac{M}{\alpha} \text{clip}(x, 0, \alpha) \right) \quad (7a)$$

$$= \frac{\alpha}{M} \text{round} \left( M \text{ clip} \left( \frac{x}{\alpha}, 0, 1 \right) \right) \quad (7b)$$

$$= \frac{\alpha}{M} \text{round} \left( \frac{M}{2^{WL} - 1} \text{clip} \left( \frac{2^{WL} - 1}{\alpha} x, 0, 2^{WL} - 1 \right) \right) \quad (7c)$$

$$= \frac{2^{WL} - 1}{M} \frac{2^{FL}\alpha}{2^{WL} - 1} \frac{1}{2^{FL}} \text{round} \quad (7d)$$
$$\left( \frac{M}{2^{WL} - 1} \text{clip} \left( \frac{2^{WL} - 1}{2^{FL}\alpha} x * 2^{FL}, 0, 2^{WL} - 1 \right) \right)$$

for postivie $\alpha$, For $M = 2^{WL} - 1$,      (8)

which is the typical setting for quantization, we have $$\text{PACT}(x) = \frac{2^{FL}\alpha}{2^{WL} - 1} \frac{1}{2^{FL}} \text{ round } \left( \text{clip } \left( \frac{2^{WL} - 1}{2^{FL}\alpha} x * 2^{FL}, 0, 2^{WL} - 1 \right) \right).$$

Comparing with the expression for fixed-point quantization in Equation (2), one gets:

$$\text{PACT}(x) = \frac{2^{FL}\alpha}{2^{WL} - 1} \text{fix\_quant} \left( \frac{2^{WL} - 1}{2^{FL}\alpha} x \right), \quad (4)$$

With this relationship, PACT may be implemented to train the clipping-level $\alpha$ implicitly with fixed-point quantization.

In Equation (2), the formula for fixed-point quantization of the unsigned case is provided. For weight and activation from some layer of the neural network without following ReLU nonlinearity (such as some layers in MobileNet V2), signed quantization may be necessary, and the expression is similarly given as:

$$\text{fix\_quant}(x) = \frac{1}{2^{FL}} \text{ round } \left( \text{clip } \left( x \cdot 2^{FL}, -2^{WL-1} + 1, 2^{WL-1} - 1 \right) \right), \quad (9)$$

where clip is the clipping function and $0 \leq FL \leq WL - 1$.

Updating BN and Fractional Length

To quantize the whole model with only 8-bit fixed-point multiplication involved, the scaling factor from the batch normalization (BN) layer is tackled, including both the weight and running variance. Specifically, the method quantizes on the effective weight that fuses the weight of convolution layers with the weight and running variance from BN. This raises the question of how to determine the running statistics during training. To solve this problem, the forward computation for BN fusion is applied twice. For the first forward, the convolution using quantized input yet full-precision weight of the convolution layer is applied and the output is used to update the running statistics of BN. In this way, the effective weight to quantize is available. It is noted that there is no backpropagation for this step. For the second forward, the method quantizes on the combined effective weight to get the final output of the two layers of convolution and BN and does the backpropagation.

The fractional length is updated by defining the fractional length for weight on-the-fly during training by inferring from the current value of weight, using equation (1). For the fractional length of activation, a buffer is used to store and update the value with a momentum of 0:1, similar to how to update BN running statistics. Once the fractional lengths are determined after training, the fractional lengths are kept fixed for inference.

Relating Scaling Factors Between Adjacent Layers of the Neural Network

As shown in Equation (4), there is still two extra factors during the quantization operation, which are denoted as a fix scaling factor $\eta_{fix}$:

$$\eta_{fix} = \frac{2^{FL}\alpha}{2^{WL} - 1}. \quad (5)0$$

Now a is a trainable parameter with full-precision, which means the fix scaling factor is also in full-precision. To eliminate undesired extra computation, it is absorbed into the above-mentioned effective weights for quantization. However, this fix scaling factor occurs twice, one for rescaling after quantization ($\eta_{fix}$) and the other for scaling before quantization ($1/\eta_{fix}$). To completely absorb it, it is needed to relate two adjacent layers of the neural network.

In fact, for a mapping that includes convolution, BN, and ReLU (see below), PACT quantization is applied to relate the activation between two adjacent layers of the neural network as:

$$q_i^{(l+1)} = \text{fix\_quant}\left(\underbrace{\sum_{j=1}^{n^{(l)}} \frac{\gamma_i^{(l)}}{\eta_{\theta x}^{(l+1)}} W_{ij}^{(l)} q_j^{(l)}}_{\text{Effective Weight}} + \underbrace{(\frac{1}{\eta_{\theta x}^{(l+1)}}\left(\beta_i^{(l)} - \frac{\gamma_i^{(l)}}{\sigma_i^{(l)}}\mu_i^{(l)}\right))}_{\text{Effective Bias}}\right), \tag{6}$$

where q is the fixed-point activation, W the full-precision weight of the convolution layer, i and j the spatial indices, n the total number of multiplication, and the superscript (l) indicates the l-th block consisting of convolution and BN. $\gamma$, $\beta$, $\sigma$, and $\mu$ are the learned weight, bias, running standard deviation, and running mean for the BN layer, respectively. Also, WL=8 for all layers.

The general procedure for deriving the equation of effective weights relating two adjacent layers, specifically, the convolutional (Conv)-batch normalization (BN)-non-linear activation function (ReLU) block with conventional PACT quantization using input clipping, quantization and dequantization, can be described as follows:

$$\text{Nonlinear: } \bar{x}_i^{(l)} = \text{clip}\left(x_i^{(l-1)}, 0, \alpha^{(l)}\right) \tag{10a}$$

$$\text{Input Quant } (uint8): \bar{q}_i^{(l)} = \text{round}\left(\frac{M}{\alpha^{(l)}}\bar{x}_i^{(l)}\right) \tag{10b}$$

$$\text{Input Dequant: } \tilde{q}_i^{(l)} = \frac{\alpha^{(l)}}{M}\bar{q}_i^{(l)} \tag{10c}$$

$$\text{Conv: } y_i^{(l)} = \sum_{j=1}^{n^{(l)}} W_{ij}^{(l)}\tilde{q}_j^{(l)} \tag{10d}$$

$$\text{BN: } x_i^{(l)} = \gamma_i^{(l)}\frac{y_i^{(l)} - \mu_i^{(l)}}{\sigma_i^{(l)}} + \beta_i^{(l)} \tag{10e}$$

$$= \frac{\gamma_i^{(l)}}{\sigma_i^{(l)}}y_i^{(l)} + \left(\beta_i^{(l)} - \frac{\gamma_i^{(l)}}{\sigma_i^{(l)}}\mu_i^{(l)}\right) \tag{10f}$$

Where x is the input before clipping, q the integer input after quantization, $\tilde{q}$ the full-precision input after dequantization, clip the clipping function, a the clipping-level, $M=2^{WL}-1$ the scaling for quantization, $W_{ij}$ the weight from the convolution layer, and $\gamma$, $\beta$, $\sigma$, and $\mu$ are the weight, bias, running standard deviation, and running mean from the BN layer, respectively, with i and j spatial indices. Equations (10a), (10b), and (10c) may be combined as:

$$\bar{q}_i^{(l)} = \text{PACT}(x)\left(x_i^{(l-1)}\right) \tag{11a}$$

$$= \eta_{fix}^{(l)}\text{fix\_quant}\left(\frac{1}{\eta_{fix}^{(l)}}x_i^{(l-1)}\right) \tag{11b}$$

$$= \eta_{fix}^{(l)}q_i^{(l)} \tag{11c}$$

where q is the fixed-point activation and the relationship given by Equation (4) and the definition from Equation (5) are used. From this, Equation (6) can be derived as:

$$q_i^{(l+1)} = \text{fix\_quant}\left(\frac{1}{\eta_{fix}^{(l+1)}}x_i^{(l)}\right) \tag{12a}$$

$$= \text{fix\_quant}\left(\frac{1}{\eta_{fix}^{(l+1)}}\left(\frac{\gamma_i^{(l)}}{\sigma_i^{(l)}}y_i^{(l)} + \left(\beta_i^{(l)} - \frac{\gamma_i^{(l)}}{\sigma_i^{(l)}}\mu_i^{(l)}\right)\right)\right) \tag{12b}$$

$$= \text{fix\_quant}\left(\frac{1}{\eta_{fix}^{(l+1)}}\left(\frac{\gamma_i^{(l)}}{\sigma_i^{(l)}}\sum_{j=1}^{n^{(l)}} W_{ij}^{(l)}\tilde{q}_j^{(l)} + \left(\beta_i^{(l)} - \frac{\gamma_i^{(l)}}{\sigma_i^{(l)}}\mu_i^{(l)}\right)\right)\right) \tag{12c}$$

$$= \text{fix\_quant}\left(\frac{1}{\eta_{fix}^{(l+1)}}\left(\frac{\gamma_i^{(l)}}{\sigma_i^{(l)}}\sum_{j=1}^{n^{(l)}} W_{ij}^{(l)}\eta_{fix}^{(l)}q_j^{(l)} + \left(\beta_i^{(l)} - \frac{\gamma_i^{(l)}}{\sigma_i^{(l)}}\mu_i^{(l)}\right)\right)\right) \tag{12d}$$

$$= \text{fix\_quant}\left(\sum_{j=1}^{n^{(l)}} \frac{\gamma_i^{(l)}}{\sigma_i^{(l)}}\frac{\eta_{\theta x}^{(l)}}{\eta_{fix}^{(l+1)}}W_{ij}^{(l)}q_j^{(l)} + \frac{1}{\eta_{fix}^{(l+1)}}\left(\beta_i^{(l)} - \frac{\gamma_i^{(l)}}{\sigma_i^{(l)}}\mu_i^{(l)}\right)\right) \tag{12e}$$

As can be seen from Equation (6), to obtain the final effective weight for fixed-point quantization, for the l-th Conv-BN block, one needs to access the fix scaling factor, or equivalently, the clipping-level and the activation fractional length FL, from its following (l+1)-th block(s). To achieve this, two techniques are applied: pre-estimating fractional length and clipping-level sharing.

Pre-Estimating Fractional Length

As mentioned above, the activation fractional length is determined from its standard deviation. However, to calculate the effective weight, the FL from the next layer of the neural network is used (see Equation (6)), which is not available until the computation of current layer of the neural network is finished. To avoid this chicken-egg dilemma, when computing the effective weight, the previously stored activation fractional length for the following layer is used.

Clipping-Level Sharing

Figure 10A:
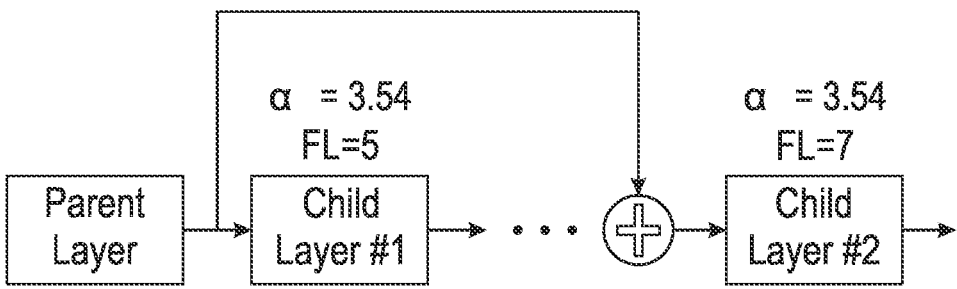
FIG. 10A illustrates the case of direct residual connection.
Figure 10B:
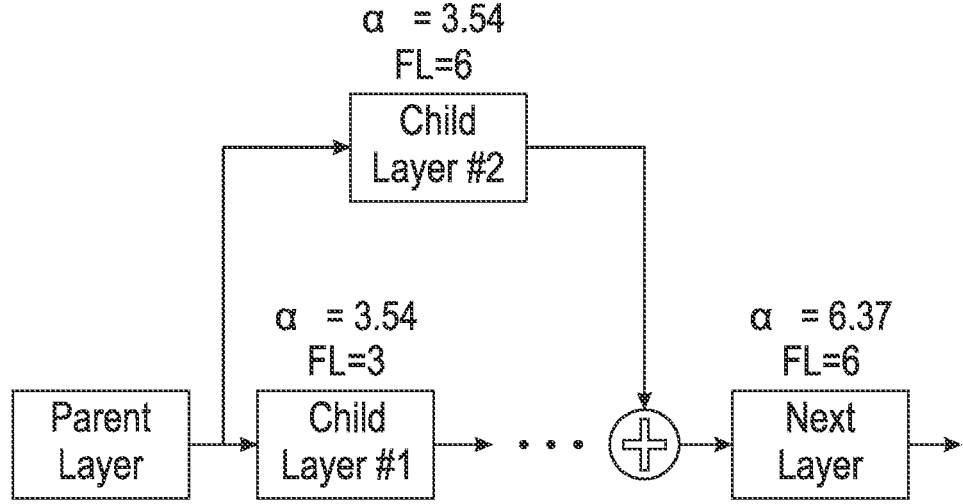
FIG. 10B illustrates the case of a down-sampling convolution layer.

As shown in FIGS. 10A and 10B, for residual blocks, some layers have two following layers (which are also called child layers). FIGS. 10A and 10B illustrate the problem of residual connections. For a layer with several layers (children layers) directly following it, one is chosen to be the master and all its sibling layers use the master layer's clipping level. On the other hand, since using different fractional length only causes bit shifting or different fixed-point quantization formats, and the values are stored in 32-bit before being quantized into 8-bit, the fractional formats are not shared to allow more degrees of freedom. FIGS. 10A and 10B show the case of direct residual connection (FIG. 10A) and the case of a down-sampling convolution layer (FIG. 10B).

To avoid the problem of inconsistent fix scaling factor when computing the effective weight for the parent layer, one layer is defined as master and all its siblings are forced to share its clipping-level. In fact, the best way is to share both the clipping-level and the fractional length, but it has been found that sharing fractional length leads to considerable performance drop, especially for deep models such as MobileNet V2 and ResNet50. This is because the fractional lengths play two roles here, one is for the fix scaling factor, and the other for the representing region (or equivalently the clipping-level). Using different fractional lengths effectively enables different clipping-levels (although only differ by a factor of power-of-2), which can be beneficial because the activation scales might vary from layer to layer of the neural network.

The effect of using private fractional lengths between sibling layers to indicate that this effectively enables private clipping-levels for them may be analyzed by providing the original PACT quantization step as:

$$\hat{q} = \text{PACT}(x) \tag{13a}$$

$$= \frac{2^{FL}\alpha}{2^{WL}-1}\frac{1}{2^{FL}} \text{ round}$$

$$\left(\text{clip}\left(\frac{2^{WL}-1}{2^{FL}\alpha}x*2^{FL}, 0.2^{WL}-1\right)\right) \tag{13b}$$

where the layer and spatial indices have been omitted for simplification. If using private fractional lengths for sibling layers but requiring them to share the same clipping level, and using the master child's fractional length for calculating the effective weight in Equation (6), denoting the fractional length of the master layer as $FL^m$, the above function will become:

$$\hat{q} = \frac{2^{FL}\alpha}{2^{WL}-1}\frac{1}{2^{FL}} \text{ round}\left(\text{clip}\left(\frac{2^{WL}-1}{2^{FL^m}\alpha}x*2^{FL}, 0, 2^{WL}-1\right)\right) \tag{14a}$$

$$= 2^{FL-FL^m}\frac{2^{FL}\alpha'}{2^{WL}-1}\frac{1}{2^{FL}} \text{ round}\left(\text{clip}\left(\frac{2^{WL}-1}{2^{FL}\alpha'}x*2^{FL}, 0, 2^{WL}-1\right)\right) \tag{14b}$$

where $\alpha'=2^{FL^m-FL}\alpha$. From this, using private fractional lengths effectively can be seen to enable different clipping-levels between sibling layers, and the cost is only some bit shifting.

Moreover, breaking the constraint of sharing activation fractional length will not introduce much computational cost, as the value only differs in storing format and typically the values are stored in 32-bit (i.e., the accumulation result, which are only quantized into 8-bit for multiplication). It is noted that when computing the effective weight of the parent layer, only the master child's activation fractional length is used, yet for effective weight of each child layer and fixed-point quantization on its input its private one is used.

FIG. 11 illustrates a flow chart of a sample training technique 1100 for neural network quantization with fixed-point numbers, where the formats of weight and activation in each layer are determined based on the optimal fractional length during training.

As illustrated, the process begins by determining the optimal fractional length for weight and activation for each layer of the neural network at 1110 based on the analysis described above in the derivation of Equation (1). The process then implements a parameterized clipping activation (PACT) process at 1120 to train a learned clipping-level $\alpha$ with fixed-point quantization. At 1130, the process further quantizes on the effective weight that fuses the weight of convolution layers of the neural network with the weight and running variance from the batch normalization (BN) layer. In sample configurations, a forward computation is applied twice at 1130. In a first computation, the convolution is applied using quantized input yet full-precision weight of the convolution layer and the output is used to update the running statistics of the BN layer. In the second computation, quantization on the combined effective weight is used to get the final output of the two layers of convolution and BN along with the backpropagation. At 1140, the fractional length for weight is defined on-the-fly by inferring from a current value of weight using the determined optimal fractional length for weight. At 1150, the fractional length of activation is stored in a buffer and updated with a value having a predetermined momentum. At 1160, the fixed-point activation between two adjacent layers of the neural network is related using parameterized clipping activation quantization using the clipping-level $\alpha$ and the activation fractional length (FL) from at least one following block. In a first option, the effective weight for a layer is calculated using a previously stored activation fractional length for the following layer. In another option, respective layers share a clipping-level. The resulting fixed-point weights and activation values are stored as a compressed representation of the respective computational layers of the neural network at 1170.

Experimental Results

The results for various models on ImageNet for a classification are presented and the results are compared with previous works that focus on quantization-aware training to verify the effectiveness of the method described above. The results are shown for two sets of training. First, the conventional training method following the method described by Jin et al. is used (Jin et al., "Neural Network Quantization with Scale-Adjusted Training," In BMVC, 2020b). Second, the method is unified with one recent fine-tuning method that quantizes full-precision models with high accuracy (Yao et al., "Hawq-v3: Dyadic Neural Network Quantization," In *International Conference on Machine Learning,* 2021).

Conventional Training

The method described above is first applied using conventional training, where the quantized model is trained with the simplest setting as those for full-precision model. To verify the effectiveness of the method, experiments were performed on several models including ResNet18 and MobileNet V1/V2b. Table 1 illustrates 8-bit quantization with conventional training for ResNet18 and MobileNet V1/V2b. The Integer-Only Quantization is abbreviated as "Int," INT8-Multiplication-Only Quantization is abbreviated as "8-bit," the baseline accuracy is abbreviated as "BL," and Top-1 Accuracy is abbreviated as "Top-1." All models are for 8-bit weight and activation quantization. As shown in Table 1, the method achieves state-of-the-art results for all models. Additionally, comparable or even better performance than the full-precision counterparts has been obtained.

TABLE 1

| (a) ResNet18 | | | | |
|---|---|---|---|---|
| Method | Int | 8-bit | BL | Top-1 |
| Baseline (FP) | X | X | 70.3 | 70.3 |
| RVQuant (Park et al., 2018) | X | X | 69.9 | 70.0 |
| PACT (Choi et al., 2018) | X | X | 70.2 | 69.8 |
| LSQ (Esser et al., 2019) | X | X | 70.5 | 71.1 |
| CPT (Fu et al., 2021) | X | X | — | 69.6 |
| F8Net (ours) | Y | Y | 70.3 | 71.1 |

| (b) MobileNet V1 | | | | |
|---|---|---|---|---|
| Method | Int | 8-bit | BL | Top-1 |
| Baseline (FP) | X | X | 72.4 | 72.4 |
| PACT (Choi et al., 2018) | X | X | 72.1 | 71.3 |
| TQT (Jain et al., 2019) | Y | Y | 71.1 | 71.1 |
| SAT (Jin et al., 2020b) | X | X | 71.7 | 72.6 |
| F8Net (ours) | Y | Y | 72.4 | 72.8 |

TABLE 1-continued

| (c) MobileNet V2b | | | | |
|---|---|---|---|---|
| Method | Int | 8-bit | BL | Top-1 |
| Baseline (FP) | X | X | 72.7 | 72.7 |
| PACT (Choi et al., 2018) | X | X | 72.1 | 71.7 |
| TQT (Jain et al., 2019) | Y | YX | 71.7 | 71.8 |
| SAT (Jin et al., 2020b) | X | X | 71.8 | 72.5 |
| F8Net (ours) | Y | Y | 72.7 | 72.6 |

Compared with previous works on simulated quantization that require full-precision rescaling after INT8 convolution, the method described herein is not only more efficient but also achieves better performance. On the other hand, compared with previous fixed-point quantization, the method described herein gives better results.

As illustrated in FIG. 7B for MobileNet V2, the fractional lengths for both weight and activation for each layer vary from layer to layer of the neural network. Specifically, for weight quantization, since some layers have a relatively large value range of effective weight, especially some depthwise layers, a small fractional length is necessary to avoid an overflow issue. On the other hand, for layers with a small weight scale, large fractional length has more advantages to overcome the underflow problem. The same conclusion also applies for the fractional length for activation. Indeed, for some early layers in front of a depthwise convolution layer, the activation fractional length needs to be small, yet for the later-stages, larger fractional length is desired. This further verifies the finding that using different fractional lengths for layers with the same parent is important for good performance, because layers at different depths might be siblings and require different fractional lengths (see FIG. 10).

Tiny Fine-Tuning on Full-Precision Model

Recent work in the field has focused on investigating the potential of neural network quantization. To this end, it has been suggested to tiny fine-tune on a well-pretrained full-precision model with high accuracy. In this way, it might help to avoid misleading conclusions coming from improper comparisons between weak full-precision models with a strong quantized model. To further investigate the power of the method described above and to compare it with these advanced techniques, the method described herein is also applied and fine-tune on several full-precision models with high accuracy. Also, because the number of total fine-tuning steps is very small, a grid search is applied to determine the optimal fractional lengths for this experiment. The results are listed in Table 2. As indicated in Table 2, the method described herein achieves better performance than previous methods without time-consuming and energy-consuming high-precision multiplication (namely dyadic scaling as shown in FIG. 6 at (c)). In particular, the model described herein may be used to reduce the training time as compared to prior full-precision models.

TABLE 2

| (a) ResNet18 | | | | | |
|---|---|---|---|---|---|
| Method | Int | 8-bit | Layer | BL | Top-1 |
| Baseline (FP) | X | X | — | 73.1 | 73.1 |
| HAWQ-V3 (Yao et al., 2021) | Y | X | X | 71.5 | 71.6 |
| HAWQ-V3 (Yao et al., 2021) | Y | X | Y | 71.5 | 70.9 |
| OMPQ (Ma et al., 2021) | Y | X | X | 73.1 | 72.3 |
| F8Net (ours) | Y | Y | Y | 73.1 | 72.4 |

TABLE 2-continued

| (b) ResNet50b | | | | | |
|---|---|---|---|---|---|
| Method | Int | 8-bit | Layer | BL | Top-1 |
| Baseline #1 (FP) | X | X | — | 77.6 | 77.6 |
| HAWQ-V3 (Yao et al., 2021) | Y | X | X | 77.6 | 77.5 |
| HAWQ-V3 (Yao et al., 2021) | Y | X | Y | 77.6 | 77.1 |
| F8Net (ours) | Y | Y | Y | 77.6 | 77.6 |
| Baseline #2 (FP) | X | X | — | 78.5 | 78.5 |
| HAWQ-V3 (Yao et al., 2021) | Y | X | X | 78.5 | 78.1 |
| HAWQ-V3 (Yao et al., 2021) | Y | X | Y | 78.5 | 76.7 |
| F8Net (ours) | Y | Y | Y | 78.5 | 78.1 |

Table 2 illustrates 8-bit quantization with tiny fine-tuning on a well-trained full-precision model. As in Table 1, Integer-Only Quantization is abbreviated as "Int", INT8-Multiplication-Only Quantization is abbreviated as "8-bit," Layer-Wise Quantization is abbreviated as "Layer," the baseline accuracy is abbreviated as "BL," and Top-1 Accuracy is abbreviated as "Top-1." For ResNet50, two baselines are used, one from PytorchCV (Baseline #1) and the other from Nvidia (Baseline #2), and the ResNet50b version is used. It is noted that the OMPQ is a mixed-precision quantization.

The method described herein reveals that the high-precision rescaling, no matter whether implemented in full-precision, or approximated or quantized with INT32 multiplication followed by bit-shifting (a.k.a. dyadic multiplication), is indeed unnecessary and is not the key part for quantized model to have good performance. Specifically, by properly choosing the formats for weight and activation in each layer of the neural network, comparable and even better performance with 8-bit fixed-point numbers may be achieved, which can be implemented more efficiently on specific hardware such as DSP that only supports integer operation.

It will be appreciated by those skilled in the art that in-depth statistical analysis of fixed-point numbers with smaller word-lengths may be performed and the fixed-point numbers employed for neural network quantization. Also, it will be appreciated that some computational layers may use fixed-point formats while other computational layers may use integer formats.

Machine Architecture

Figure 12:
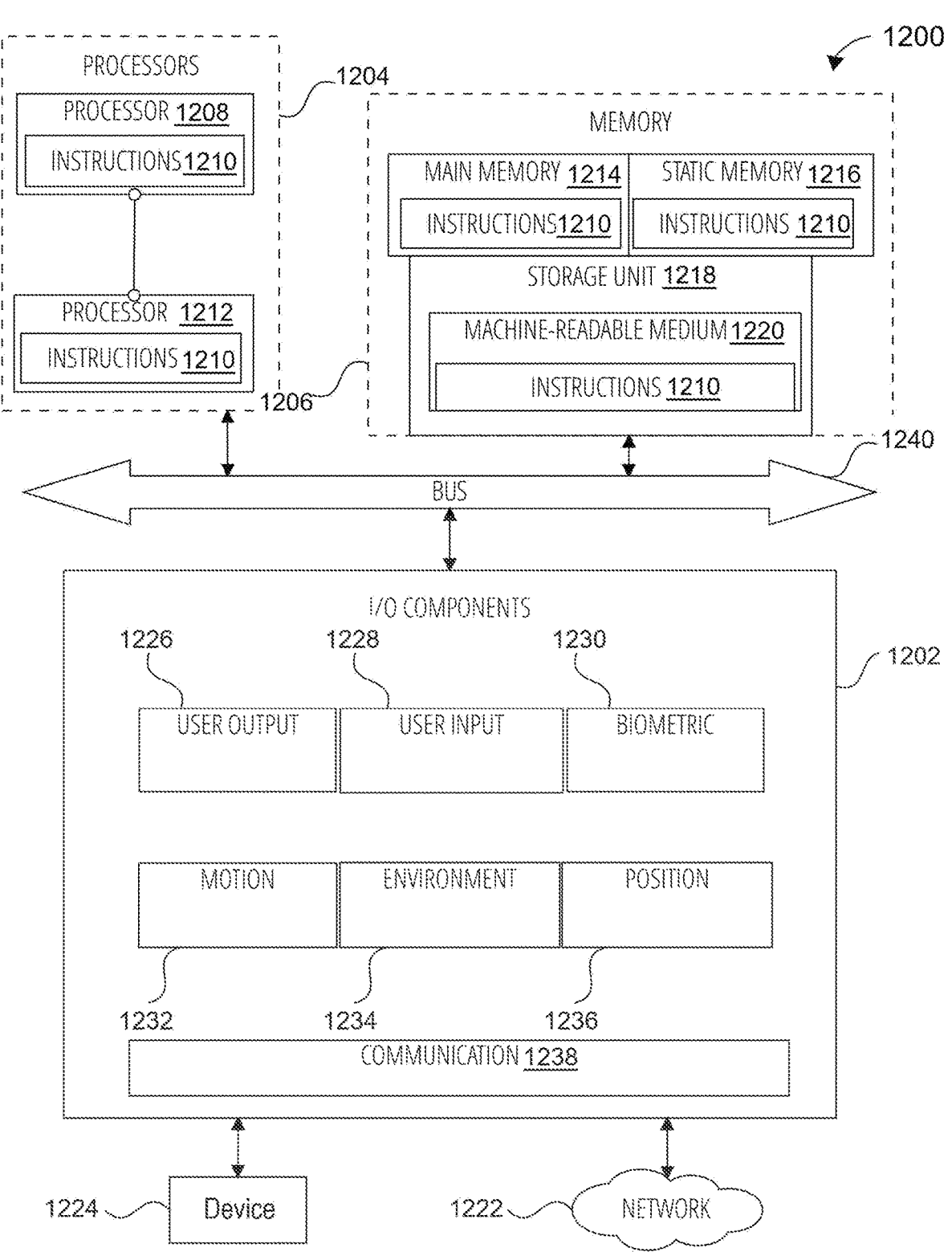
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the client device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1202, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 for any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the Processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface Component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Software Architecture

Figure 13:
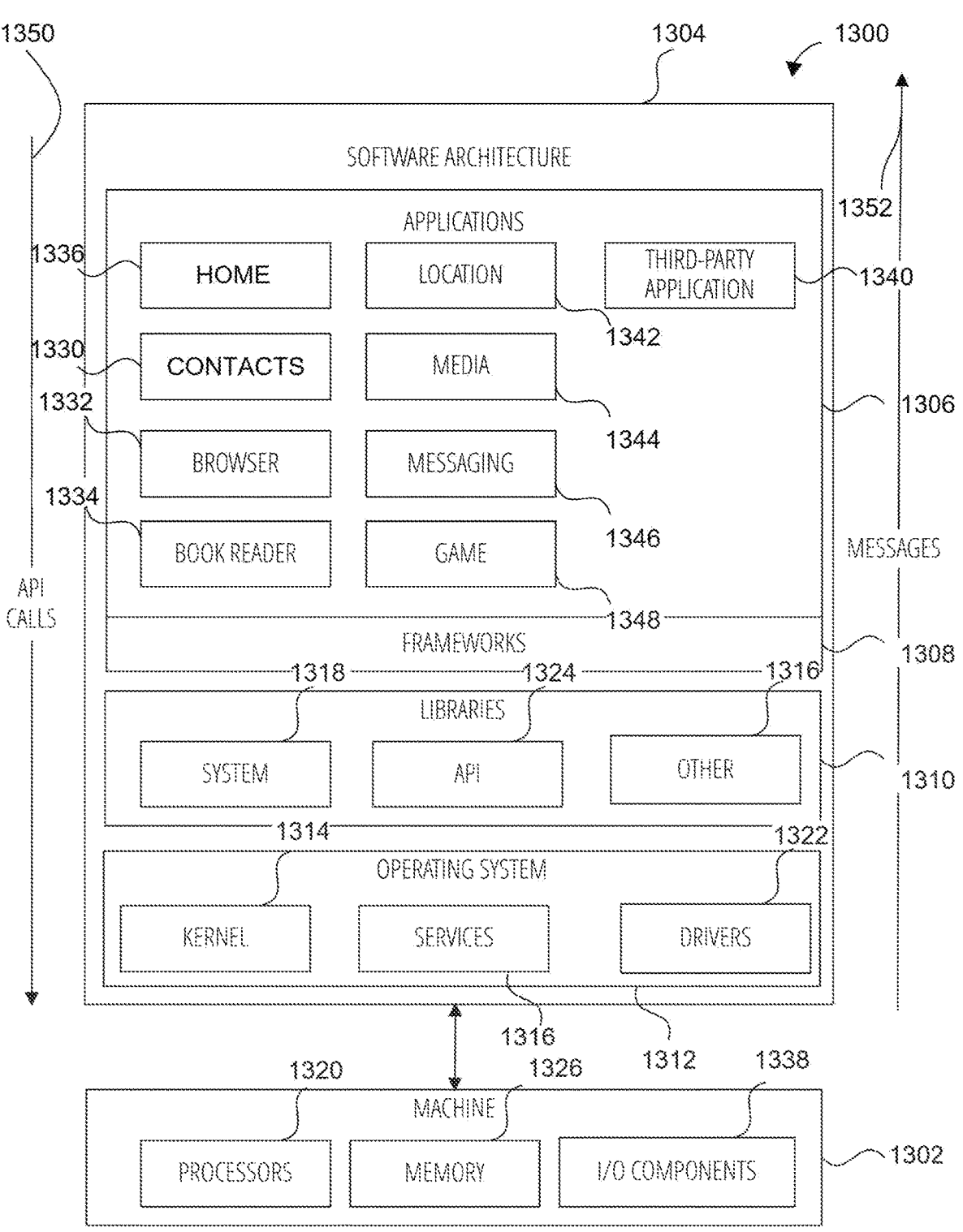
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to generate one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1304 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of using a neural network having a plurality of computational layers of nodes with associated weights and activations for each computational layer in fixed-point formats, the plurality of computational layers of nodes including at least one convolution layer and at least one batch normalization (BN) layer, the method comprising:

determining an optimal fractional length characterizing range and resolution for represented values for a weight and activation for at least two computational layers of the neural network;

training a learned clipping-level α with fixed-point quantization using a parameterized clipping activation (PACT) process to clip on a full-precision value with learned clipping-level α before quantization of the at least two computational layers of the neural network;

quantizing an effective weight that fuses a weight of the at least one convolution layer of the neural network with a weight and running variance from the at least one BN layer;

determining a fractional length for weight of the at least two computational layers of the neural network from a current value of weight using the determined optimal fractional length for the weight of the at least two computational layers of the neural network;

storing resulting fixed-point weights and activation values as a compressed representation of the respective computational layers of the neural network;

compressing parameters of the neural network by applying the stored fixed-point weights and activation values for the respective computational layers of the neural network; and classifying an image with the neural network.

2. The method of claim 1, wherein determining the optimal fractional length for the weight and activation for the at least two computational layers of the neural network comprises determining the optimal fractional length (FL*) from a standard deviation for signed quantization and for unsigned quantization as:

$$\text{Signed:} FL^* \approx \left\lfloor \log_2 \frac{40}{\sigma} \right\rfloor, \text{Unsigned:} FL^* \approx \left\lfloor \log_2 \frac{70}{\sigma} \right\rfloor. \qquad (1)$$

where σ is a threshold standard deviation value on a log scale.

3. The method of claim 1, wherein training the learned clipping-level α with fixed-point quantization using a parameterized clipping activation (PACT) process for the at least two computational layers of the neural network comprises calculating PACT(x) for input x as:

$$PACT(x) = 2^{FL}\alpha \text{ fix\_quant } ((2^{WL} - 1)(x)/2^{FL}(\alpha), 2^{WL} - 1) \qquad (4)$$

where FL is a fractional length for a fixed-point number, WL is a word length for the fixed-point number, and fix_quant is a quantization function:

$$\text{fix\_quant}(x) = \frac{1}{2^{FL}} \text{ round } (\text{clip}(x \cdot 2^{FL}, 0, 2^{WL} - 1)), \qquad (2)$$

and clip is a clipping function.

4. The method of claim 1, wherein the quantizing comprises a first computation in which a first convolution layer uses quantized input and full-precision weight and generates an output that is used to update running statistics of the at least one BN layer, and a second computation in which a second convolution layer quantizes on the effective weight to obtain a final output of the first and second convolution layers and at least one BN layer along with backpropagation.

5. The method of claim 1, further comprising updating a fractional length for weight for each computational layer of the at least two computational layers of the neural network on-the-fly during training by inferring the fractional length for weight from a current value for weight, and storing a fractional length of activation for each of the at least two computational layers of the neural network in a buffer and updating the fractional length of activation with a value having a predetermined momentum.

6. The method of claim 1, relating a fixed-point activation between two adjacent computational layers of the at least two computational layers of the neural network using a PACT quantization of the clipping-level α and an activation fractional length (FL) from at least one node in a following computational layer of the neural network by applying PACT to relate the fixed-point activation between the two adjacent computational layers of the neural network as:

$$q_i^{(l+1)} = \text{fix\_quant} \left( \underbrace{\sum_{j=1}^{n^{(l)}} \frac{\gamma_i^{(l)}}{\sigma_i^{(l)}} \frac{\eta_{\Pi x}^{(l)}}{\eta_{\Pi x}^{(l+1)}} W_{ij}^{(l)} q_j^{(l)}}_{Effective\ Weight} + \underbrace{\frac{1}{\eta_{\Pi x}^{(l+1)}} \left( \beta_i^{(l)} - \frac{\gamma_i^{(l)}}{\sigma_i^{(l)}} \mu_i^{(l)} \right)}_{Effective\ Bias} \right), \qquad (6)$$

where q is the fixed-point activation, W is a full-precision weight of the at least one convolution layer, i and j are spatial indices, n is a total number of multiplications, the superscript (l) indicates an l-th block including the at least one convolution layer and at least one BN layer, γ, β, σ, and μ are the learned weight, bias, running standard deviation, and running mean for the at least one BN layer, respectively, WL is the word length for a fixed-point number for all layers, fix_quant is a quantization function:

$$\text{fix\_quant}(x) = 1/2^{FL} \text{ round}(\text{clip}(x \cdot 2^{FL}, 0, 2^{WL} - 1)), \qquad (2)$$

and η_{fix} is a fix scaling factor:

$$\eta_{fix} = \frac{2^{FL}\alpha}{2^{WL} - 1}. \qquad (5)$$

where FL is the fractional length for the fixed-point number for all computational layers.

7. The method of claim 1, wherein the effective weight for a computational layer is calculated using a previously stored activation fractional length for a following computational layer.

8. The method of claim 1, wherein respective computational layers of the neural network share the clipping-level α.

9. The method of claim 1, further comprising using different activation fractional lengths for different computational layers.

10. The method of claim 1, wherein a first portion of the plurality of computational layers of nodes with associated weights and activations for each computational layer are in fixed-point formats, and a second portion of the plurality of computational layers of nodes with associated weights and activations for each computational layer are in integer formats.

11. A system comprising:
a processor;
a neural network for classifying an image, the neural network having a plurality of computational layers of nodes with associated weights and activations for each computational layer in fixed-point formats, the plurality of computational layers of nodes including at least one convolution layer and at least one batch normalization (BN) layer; and
a memory storing computer readable instructions that, when executed by the processor, configure the system to use the neural network by performing operations including:
determining an optimal fractional length characterizing range and resolution for represented values for a weight and activation for at least two computational layers of the neural network;
training a learned clipping-level α with fixed-point quantization using a parameterized clipping activation (PACT) process to clip on a full-precision value with learned clipping-level α before quantization of the at least two computational layers of the neural network;
quantizing an effective weight that fuses a weight of the at least one convolution layer of the neural network with a weight and running variance from the at least one BN layer;
determining a fractional length for weight of the at least two computational layers of the neural network from a current value of weight using the determined optimal fractional length for the weight of the at least two computational layers of the neural network;
storing resulting fixed-point weights and activation values as a compressed representation of respective computational layers of the neural network; and
compressing parameters of the neural network by applying the stored fixed-point weights and activation values for the respective computational layers of the neural network.

12. The system of claim 11, further comprising instructions for determining the optimal fractional length for the weight and activation for the at least two computational layers of the neural network that when executed by the processor cause the processor to perform operations comprising determining the optimal fractional length (FL*) from a standard deviation for signed quantization and for unsigned quantization as:

$$\text{Signed:} FL^* \approx \left\lfloor \log_2 \frac{40}{\sigma} \right\rfloor, \text{Unsigned:} FL^* \approx \left\lfloor \log_2 \frac{70}{\sigma} \right\rfloor. \quad (1)$$

where $\sigma$ is a threshold standard deviation value on a log scale.

13. The system of claim 11, further comprising instructions for training the learned clipping-level $\alpha$ with fixed-point quantization using a parameterized clipping activation (PACT) process for the at least two computational layers of the neural network that when executed by the processor cause the processor to perform operations comprising executing instructions calculating PACT(x) for input x as:

$$\text{PACT}(x) = 2^{FL}\alpha \text{ fix\_quant} \left( (2^{WL} - 1)(x)/2^{FL}(\alpha), 2^{WL} - 1 \right) \quad (4)$$

where FL is a fractional length for a fixed-point number, WL is a word length for the fixed-point number, and fix_quant is a quantization function:

$$\text{fix\_quant}(x) = \frac{1}{2^{FL}} \text{ round} \left( \text{clip} \left( x \cdot 2^{FL} 0, 2^{WL} - 1 \right) \right), \quad (2)$$

and clip is a clipping function.

14. The system of claim 11, further comprising instructions for quantizing that when executed by the processor cause the processor to perform operations including executing a first computation in which a first convolution layer uses quantized input and full-precision weight and generates an output that is used to update running statistics of the at least one BN layer, and executing a second computation in which a second convolution layer quantizes the effective weight to obtain a final output of the first and second convolution layers and at least one BN layer along with backpropagation.

15. The system of claim 11, further comprising instructions that when executed by the processor cause the processor to perform operations including updating a fractional length for weight for each computational layer of the at least two computational layers of the neural network on-the-fly during training by inferring the fractional length for weight from a current value for weight, and storing a fractional length of activation for each of the at least two computational layers of the neural network in a buffer and updating the fractional length of activation with a value having a predetermined momentum.

16. The system of claim 11, further comprising instructions for relating a fixed-point activation between two adjacent computational layers of the at least two computational layers of the neural network using a PACT quantization of the clipping-level $\alpha$ and an activation fractional length (FL) from at least one node in a following computational layer of the neural network that when executed by the processor cause the processor to perform operations including applying PACT to relate the fixed-point activation between the two adjacent computational layers of the neural network as:

$$q_i^{(l+1)} = \text{fix\_quant}\left( \underbrace{\sum_{j=1}^{n^{(l)}} \frac{\gamma_i^{(l)}}{\sigma_i^{(l)}} \frac{\eta_{\Pi x}^{(l)}}{\eta_{\Pi x}^{(l+1)}} W_{ij}^{(l)} q_j^{(l)}}_{\text{Effective Weight}} + \underbrace{\frac{1}{\eta_{\Pi x}^{(l+1)}} \left( \beta_i^{(l)} - \frac{\gamma_i^{(l)}}{\sigma_i^{(l)}} \mu_i^{(l)} \right)}_{\text{Effective Bias}} \right), \quad (6)$$

where q is the fixed-point activation, W is a full-precision weight of the at least one convolution layer, i and j are spatial indices, n is a total number of multiplications, the superscript (l) indicates an l-th block including the at least one convolution layer and at least one BN layer, $\gamma$, $\beta$, $\sigma$, and $\mu$ are the learned weight, bias, running standard deviation, and running mean for the at least one BN layer, respectively, WL is the word length for a fixed-point number for all layers, fix_quant is a quantization function:

$$\text{fix\_quant}(x) = \frac{1}{2^{FL}} \text{ round} \left( \text{clip} \left( x \cdot 2^{FL} 0, 2^{WL} - 1 \right) \right), \quad (2)$$

and $\eta_{fix}$ is a fix scaling factor:

$$\eta_{fix} = \frac{2^{FL}\alpha}{2^{WL} - 1}. \quad (5)$$

where FL is the fractional length for the fixed-point number for all computational layers.

17. A non-transitory computer-readable storage medium, the computer-readable storage medium including instructions that when executed by a processor cause the processor to use a neural network having a plurality of computational layers of nodes with associated weights and activations for each computational layer in fixed-point formats, the plurality of computational layers of nodes including at least one convolution layer and at least one batch normalization (BN) layer by performing operations comprising:

determining an optimal fractional length characterizing range and resolution for represented values for a weight and activation for at least two computational layers of the neural network;

training a learned clipping-level $\alpha$ with fixed-point quantization using a parameterized clipping activation (PACT) process to clip on a full-precision value with learned clipping-level $\alpha$ before quantization of the at least two computational layers of the neural network;

quantizing an effective weight that fuses a weight of the at least one convolution layer of the neural network with a weight and running variance from the at least one BN layer;

determining a fractional length for weight of the at least two computational layers of the neural network from a current value of weight using the determined optimal fractional length for the weight of the at least two computational layers of the neural network;

relating a fixed-point activation between two adjacent computational layers of the at least two computational layers of the neural network using a PACT quantization of the clipping-level $\alpha$ and an activation fractional length (FL) from at least one node in a following computational layer of the neural network;

storing resulting fixed-point weights and activation values as a compressed representation of respective computational layers of the neural network;

compressing parameters of the neural network by apply-
ing the stored fixed point weights and activation values
for the respective computational layers of the neural
network; and classifying an image with the neural network.

18. The non-transitory computer-readable storage
medium of claim 17, further comprising instructions that
when executed by a processor cause the processor to train
the learned clipping-level $\alpha$ with fixed-point quantization
using a parameterized clipping activation (PACT) process
for the at least two computational layers of the neural
network comprises calculating PACT(x) for input x as:

$$\text{PACT}(x) = 2^{FL}\alpha \ \text{fix\_quant}\left(\left(2^{WL} - 1\right)(x)/2^{FL}(\alpha), 2^{WL} - 1\right) \qquad (4)$$

where FL is a fractional length for a fixed-point number,
WL is a word length for the fixed-point number, and
fix_quant is a quantization function:

$$\text{fix\_quant}(x) = \frac{1}{2^{FL}} \ \text{round}\left(\text{clip}\left(x \cdot 2^{FL} 0, 2^{WL} - 1\right)\right), \qquad (2)$$

and clip is a clipping function.

* * * * *